US012741350B2

(12) United States Patent
Nakamura et al.

(10) Patent No.: US 12,741,350 B2
(45) Date of Patent: Sep. 22, 2026

(54) MACHINE TOOL

(71) Applicant: DMG MORI CO., LTD., Nara (JP)

(72) Inventors: Susumu Nakamura, Nara (JP); Tadaharu Morimoto, Nara (JP); Tatsuya Aizawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 547 days.

(21) Appl. No.: 18/262,157

(22) PCT Filed: Dec. 23, 2022

(86) PCT No.: PCT/JP2022/047533

§ 371 (c)(1),
(2) Date: Jul. 19, 2023

(87) PCT Pub. No.: WO2024/134860

PCT Pub. Date: Jun. 27, 2024

(65) Prior Publication Data

US 2024/0391041 A1 Nov. 28, 2024

(51) Int. Cl.
*B23Q 3/157* (2006.01)
*B23Q 3/155* (2006.01)
*B23Q 11/08* (2006.01)

(52) U.S. Cl.
CPC ..... *B23Q 3/15713* (2013.01); *B23Q 3/15536* (2016.11); *B23Q 11/0891* (2013.01);
(Continued)

(58) Field of Classification Search
CPC ............ B23Q 3/15513; B23Q 3/15536; B23Q 3/15713–15766; B23Q 11/08;
(Continued)

(56) References Cited

U.S. PATENT DOCUMENTS

2009/0036282 A1* 2/2009 Yasuda .............. B23Q 11/0891 483/3
2024/0217042 A1* 7/2024 Tanaka ............... B23Q 3/15539

FOREIGN PATENT DOCUMENTS

CH 699221 A2 * 1/2010 ......... B23Q 3/15539
JP H1034475 A 2/1998
(Continued)

OTHER PUBLICATIONS

Translation of CH699221 (Year: 2008).*
(Continued)

*Primary Examiner* — Matthew P Travers

(57) ABSTRACT

A machine tool includes a spindle for detachably attaching a tool thereto, a tool stocker storing the tool, a tool conveyance mechanism having a tool holding unit for detachably holding the tool and moving the tool holding unit along a path, and a conveyance control unit controlling driving of the tool conveyance mechanism. The tool conveyance mechanism is configured to move the tool holding unit to a tool change position, a stocker position, and a position for work. The tool change position allows the tool to be transferred between the spindle and the tool holding unit, the stocker position allows the tool to be transferred between the tool stocker and the tool holding unit, and the position for work allows a worker to access the tool holding unit and perform attachment/removal of the tool from a working area set outside the machine tool.

8 Claims, 11 Drawing Sheets

(52) U.S. Cl.
CPC ............. *B23Q 2003/155407* (2016.11); *Y10T 483/115* (2015.01)

(58) Field of Classification Search
CPC ............. B23Q 11/0891; Y10T 483/115; Y10T 483/1714–1717; Y10T 483/1724; Y10T 483/1748–175; Y10T 483/1783–1786
See application file for complete search history.

(56) References Cited

FOREIGN PATENT DOCUMENTS

| | | | | |
|---|---|---|---|---|
| JP | H1158161 A | 3/1999 | | |
| JP | 2009034803 A | 2/2009 | | |
| WO | 2021038718 A1 | 3/2021 | | |
| WO | 2022024454 A1 | 2/2022 | | |
| WO | WO-2022230036 A1 * | 11/2022 | ................ | B25J 5/02 |

OTHER PUBLICATIONS

Translation of WO2022024454 (Year: 2022).*
International Search Report and Written Opinion for related Application No. PCT/JP2022/047533; report dated Mar. 3, 2023.

* cited by examiner 58
58b
58a
54b
54c
54
54a
50
52 51
56
57a 57
56
55
59b
59a
13
61a
21a
21
21b
53
63
61e
59
20
Front
Rear B
62(6)
M2 M1 54
50(5)
58a
58b
58
61a
52
61f
13
81
64b
8
21a
21
21b
61g
61e
7
14
64a
64c
T1 59 T2
C
64
71
10
A
W
71a
12
2 9 P
12a
4
42
43
41
44
33 31 32 11
3
Left Right 1
62(6)
63(6)
61a
20
8
54
50
52
51
61e
13
81
61d
61(6)
9
2
T2
58a
58b
58
44
61f
10
W
A
P
59
61c
T2
12
32
3
33
31
64
Rear
11
12a
Left
Right
Front B
62(6)
M2 M1 54
50(5)
58a
58b
58
52
13
61e
61f
61g
61b(65)
81
8
64b
21a
21b
21
14
64c
64a
64
T1
C
59
T2
10
W
7
71
71a
A
12
42
43
41
44
4
2
9
P
33 31 32
3
11
12a Left Right

MACHINE TOOL

TECHNICAL FIELD

The present invention relates to a machine tool that includes a spindle detachably holding a tool, a tool stocker storing the tool to be attached to the spindle, a tool conveyance mechanism having a tool holding unit for detachably holding the tool and moving the tool holding unit along a predetermined path, and a conveyance control unit controlling the tool conveyance mechanism.

BACKGROUND ART

A known example of the machine tool of this type is disclosed in Japanese Unexamined Patent Application Publication No. H11-58161 (Patent Literature 1).

This machine tool includes a standard tool magazine, a large-sized tool magazine (tool stocker), and a tool conveyance mechanism. The standard tool magazine is affixed to a machine tool body. The large-sized tool magazine stores a long-length tool that is unable to be stored in the standard tool magazine. The tool conveyance mechanism conveys the long-length tool. The tool conveyance mechanism has a tool holding unit for holding the long-length tool. The tool holding unit is configured to be movable between a tool storage position set inside the large-sized tool magazine and a tool change position set inside a machining chamber. In automatic tool change for the long-length tool, the tool holding unit of the tool conveyance mechanism is moved to the tool change position under control by the conveyance control unit. After the tool holding unit has been moved to the tool change position, a spindle head is moved in X-axis, Y-axis, and Z-axis directions such that the tool held by the tool holding unit and the tool attached to the spindle are exchanged.

CITATION LIST

Patent Literature

Patent Literature 1: Japanese Unexamined Patent Application Publication No. H11-58161

SUMMARY OF INVENTION

Technical Problem

In the machine tool disclosed in the Patent Literature 1, the tool holding unit is movable to only two positions, namely, the tool change position set inside the machining chamber and the tool storage position (stocker position) set inside the large-sized tool magazine (tool stocker). This configuration requires a worker to directly access the tool stocker to perform setup of the tool to be stored in the tool stocker; therefore, there is the problem that the working efficiency of the tool setup is poor. In particular, in the case where the tool stocker is arranged on the ceiling of the machine tool as disclosed in Patent Literature 1, the worker has to perform work at a high place using a ladder or the like to access the tool stocker; therefore, the working efficiency is significantly poor.

To avoid this problem, it may be possible to temporarily move the tool stored in the tool stocker to the tool change position with the tool conveyance mechanism in order to perform the tool setup. However, this operation requires the worker to enter the machining chamber, where the tool change position is set, to perform the tool setup. Therefore, in terms of providing high working efficiency and high safety, there is room for further improvement.

The present invention has been achieved in view of the above-described circumstances, and an object of the invention is to provide a further improved machine tool which includes a spindle detachably holding a tool, a tool stocker storing the tool to be attached to the spindle, a tool conveyance mechanism having a tool holding unit for detachably holding the tool and moving the tool holding unit along a predetermined path, and a conveyance control unit controlling the tool conveyance mechanism and which enables easy and safe setup of the tool to be stored in the tool stocker.

Solution to Problem

To solve the above-described problem, the present invention provides a machine tool at least including:

- a spindle arranged in a machining area and configured to detachably hold a tool; and
- a cover body formed by at least a ceiling cover and a side wall cover and surrounding the machining area to separate the machining area from outside, wherein:
- the machine tool includes:
  - a tool stocker storing the tool to be attached to the spindle;
  - a tool conveyance mechanism having a tool holding unit for detachably holding the tool and configured to move the tool holding unit along a predetermined path; and
  - a conveyance control unit configured to control the tool conveyance mechanism; and
- the tool conveyance mechanism is configured to be able to move the tool holding unit at least to a tool change position, a stocker position, and a position for work.

Note that the tool change position is a position for transferring the tool between the spindle and the tool holding unit, the stocker position is a position for transferring the tool between the tool stocker and the tool holding unit, and the position for work is set as a position for a worker to perform work on the tool holding unit from outside of the machining area.

In this machine tool, the tool holding unit of the tool conveyance mechanism is movable at least to the tool change position, the stocker position, and the position for work under control by the conveyance control unit. The position for work is set as a position for a worker to perform work, such as attachment/removal of a tool, on the tool holding unit from outside of the machining area. Therefore, the worker can carry out tool setup to the tool stocker without performing work directly on the tool stocker. For example, the worker can carry out the tool setup to the tool stocker by moving the tool holding unit of the tool conveyance mechanism to the position for work under control by the conveyance control unit and performing attachment/removal of a tool on the tool holding unit and then causing the tool conveyance mechanism to store the tool held by the tool holding unit into the tool stocker. Thus, the worker does not need to enter the machining area (machining chamber) of the machine tool or access a less safe area (for example, a high place) and the worker can easily and safely perform the tool setup to the tool stocker from outside of the machine tool through operation of the tool conveyance mechanism.

It is preferred that the tool stocker is arranged outside the cover body, especially, on top of the ceiling cover or above the ceiling cover.

Arranging the tool stocker outside the cover body prevents coolant and chips scattering during workpiece machining from adhering to the tool stored in the tool stocker. Therefore, the tool is always kept clean, which enables avoidance of problems such as defects in attachment of the tool to the spindle and defects in workpiece cutting.

Further, arranging the tool stocker on top of the ceiling cover or above the ceiling cover reduces the cost required for safety measures. For example, if the tool stocker is arranged on the same floor as where the worker works, it is necessary to provide a safety fens or a human detection sensor for entry detection to prevent the worker from accidentally entering the area where the tool stocker is arranged. Arranging the tool stocker on top of or above the ceiling cover of the machine tool, which are originally less likely to be approached by the worker, cuts the cost required for such safety measures.

It is preferred that: the tool change position and the position for work are set inside the machining area; the tool conveyance mechanism is arranged to be located above the ceiling cover; and the ceiling cover has formed therein a first opening for the tool holding unit of the tool conveyance mechanism to pass through when moved to the tool change position and has formed therein a second opening for the tool holding unit to pass through when moved to the position for work.

In this configuration, the tool holding unit of the tool conveyance mechanism is able to move to the tool change position through the first opening formed in the ceiling cover. Further, the tool holding unit of the tool conveyance mechanism is able to move to the operation for work through the second opening formed in the ceiling cover. Forming these first and second openings in the ceiling cover secures the movement path (the path between the tool change position, the stocker position, and the position for work) for the tool holding unit with the tool stocker arranged outside the cover body.

It is preferred that: the position for work is set inside the machining area adjacent to the side wall cover; the side wall cover and the ceiling cover adjacent to the position for work respectively have third openings formed therein and the third openings are connected to each other; the machine tool further includes a movable door configured to open and close the third openings by linear sliding movement; the movable door has a door body part opening and closing the third opening formed in the side wall cover and a ceiling door part connected to an upper end of the door body part and opening and closing the third opening formed in the ceiling cover; and the second opening is formed in the ceiling door part.

In this configuration, when the movable door is moved from a closed position to an open position, the door body part and the ceiling door part connected to the upper end of the door body part slide together and thereby the third openings formed in the ceiling cover and side wall cover of the machine tool are opened. Therefore, the worker can perform loading/unloading of an object into/from the machining area using a hoisting device such as a crane through the third openings as necessary. Thus, the worker can use a hoisting device in performing attachment/removal of a tool on the tool holding unit of the tool conveyance mechanism positioned at the operation for work, thereby reducing the physical load applied to his/her arms and waist.

It is preferred that the machine tool further includes a first opening and closing mechanism configured to open and close the first opening and a second opening and closing mechanism configured to open and close the second opening.

In this configuration, for example, closing the first opening and the second opening with the first opening and closing mechanism and the second opening and closing mechanism in machining a workpiece in the machining area prevents chips produced in the machining and coolant from scattering out of the machining area.

It is preferred that: the machine tool includes the tool stocker as a first tool stocker and further includes a second tool stocker different from the first tool stocker; the second tool stocker has a plurality of tool holding units connected successively and is configured to detachably hold a tool in each of the tool holding units; the machine tool further includes a tool changer configured to perform tool change between the spindle and the second tool stocker; and the position for work is set on a side opposite to the second tool stocker with the spindle therebetween.

In this configuration, it is possible to carry out the tool setup to the first tool stocker without hindering tool setup to the second tool stocker.

Further, it is preferred that the first tool stocker is configured to be able to store a tool having a greater length than the tool to be stored in the second tool stocker.

Most long-length tools are heavier than standard tools; therefore, the physical load applied to the worker in setup of a long-length tool is greater than that in setup of a standard tool. In this configuration, setup of a long-length tool is carried out using the tool conveyance mechanism; therefore, the physical load applied to the worker in the setup is reduced.

It is preferred that a position of the spindle when the tool is transferred between the tool holding unit of the tool conveyance mechanism at the tool change position and the spindle and a position of the spindle when the tool changer performs the tool change are set at a same position.

In this configuration, it is not necessary to change the position of the spindle in causing the tool changer to pull out a used tool from the spindle and then moving the tool holding unit of the tool conveyance mechanism to the tool change position to attach a tool to be used next to the spindle; therefore, this tool change is carried out quickly.

Advantageous Effects of Invention

As described above, the machine tool according to the present invention is configured such that the tool conveyance mechanism is able to move the tool holding unit at least to the tool change position, the stocker position, and the position for work, which enables tool setup to the tool stocker to be carried out easily and safely.

DESCRIPTION OF EMBODIMENTS

Hereinafter, specific embodiments of the present invention will be described with reference to the drawings.

Embodiment 1

Figure 1:
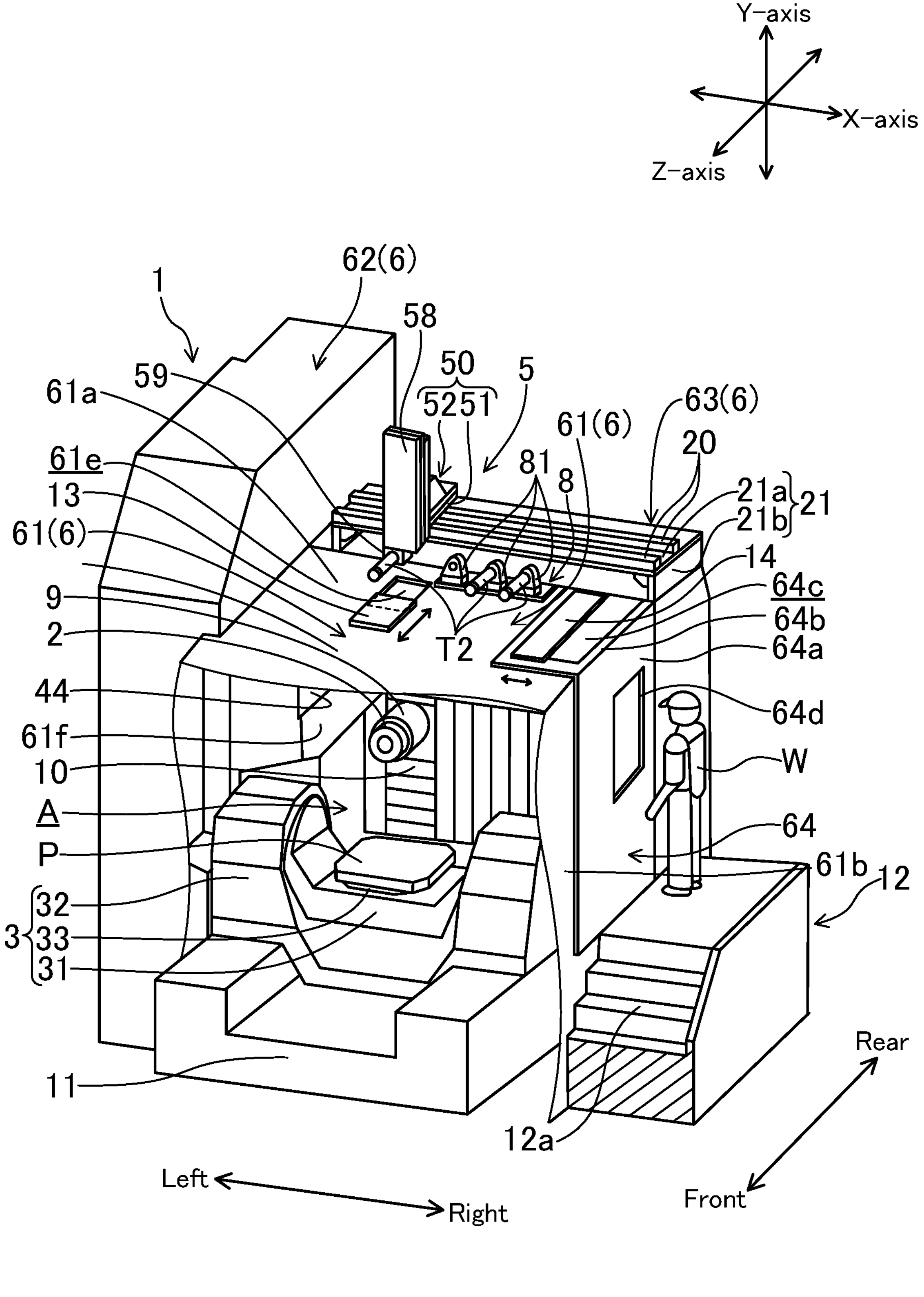
FIG. 1 is a perspective view illustrating a machine tool according to Embodiment 1.
Figure 2:
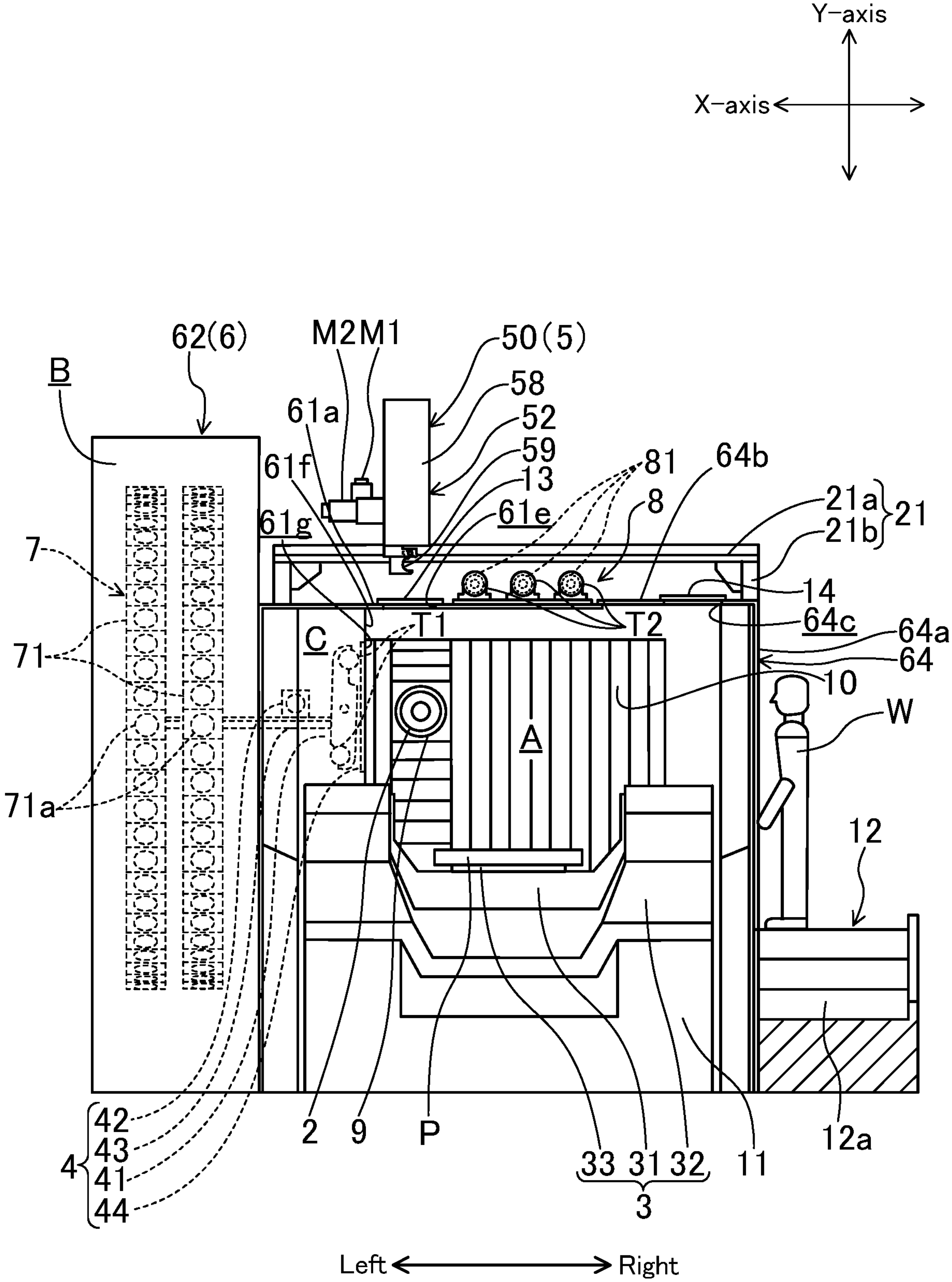
FIG. 2 is a front view showing a state where a tool holding unit of a tool conveyance mechanism is positioned at a stand-by position.

FIG. 1 is a perspective view illustrating a machine tool 1 according to Embodiment 1. FIG. 2 is a schematic diagram illustrating the machine tool 1 as viewed from the front side thereof. The terms "front", "rear", "left", and "right" in the following description are defined with respect to the machine tool 1 unless otherwise indicated (refer to the directional axes shown in the figures). In the figures, plate-shaped elements are sometimes depicted with the thickness thereof omitted and cross sections thereof are sometimes depicted with no hatching.

Figure 9:
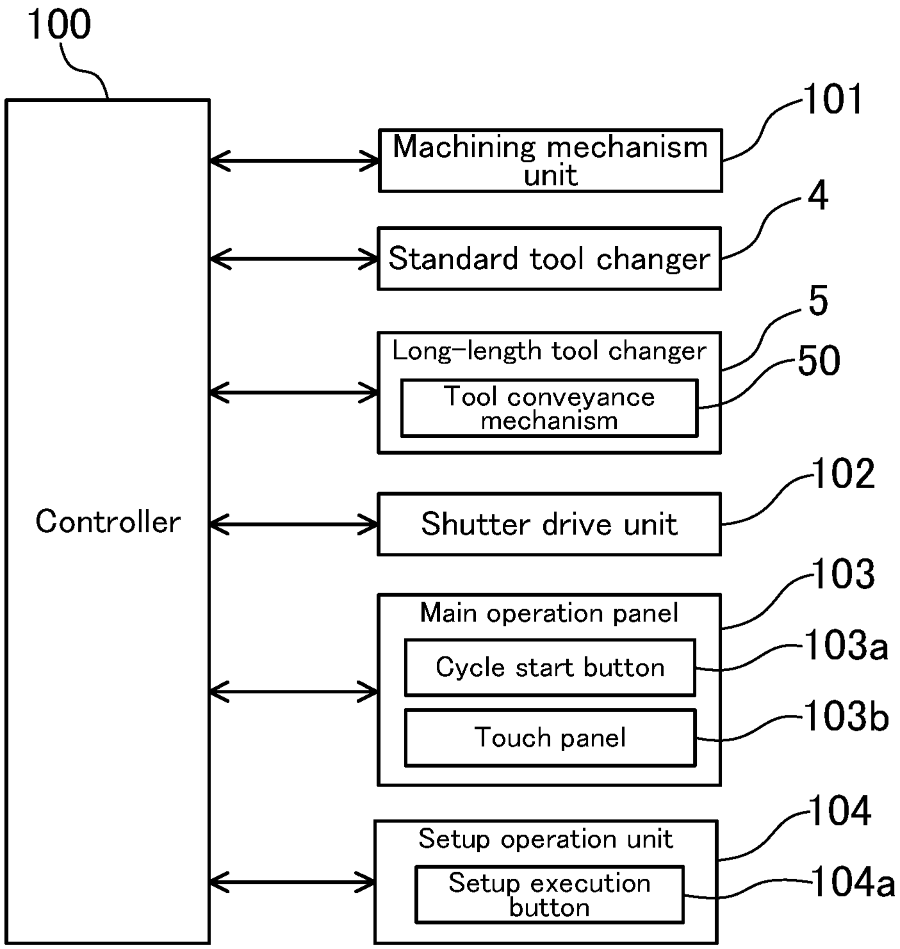
FIG. 9 is a block diagram illustrating a configuration of a control system of the machine tool.

The machine tool 1 is a horizontal machining center that includes a spindle 2, a workpiece support device 3, a standard tool changer 4, a long-length tool changer 5, an outer cover 6, and a controller 100 (illustrated only in FIG. 9). The spindle 2 is arranged to horizontally protrude into a machining chamber A as a machining area located in the front area of the machine tool 1. The workpiece support device 3 is arranged in the machining chamber A to support a workpiece that is not illustrated. The outer cover 6 serves as a cover body that covers the entire machine tool 1. The controller 100 operationally controls the entire machine tool 1. Note that FIG. 1 shows the machine tool 1 with the front face thereof omitted. In actual, the machine tool 1 has on the front face thereof the outer cover 6 and an opening and closing door (not illustrated) mounted on the outer cover 6.

As illustrated in FIG. 2, the standard tool changer 4 is a typical magazine-type automatic tool changer. The standard tool changer 4 performs tool change between a standard tool stocker 7 arranged at the left end in the machine tool 1 and the spindle 2. The long-length tool changer 5 performs tool change between a long-length tool stocker 8 arranged on the top of the machine tool 1 and the spindle 2 with a tool conveyance mechanism 50 that is described later. The long-length tool stocker 8 stores a long-length tool T2 that has a size exceeding the tool size allowed for the standard tool stocker 7. Examples of the long-length tool T2 include a line boring bar. The long-length tool stocker 8 corresponds to the first tool stocker. The standard tool stocker 7 corresponds to the second tool stocker.

The spindle 2 is rotatably held by a spindle head 9. The spindle head 9 is held by a column, not illustrated, erected on a rear end of a bed 11 and is movable in an up-down direction (Y-axis direction). The column is supported on the top of the rear end of the bed 11 and is movable in a left-right direction (X-axis direction). This configuration enables the spindle head 9 to move in an X-axis and Y-axis plane. Movements of the spindle head 9 in the X-axis direction and in the Y-axis direction are each carried out by a feed drive mechanism (not illustrated) including a ball screw and a servo motor driving the ball screw.

The spindle head 9 protrudes into the machining chamber A by penetrating through a protective cover 10 arranged on the front side of the column. The protective cover 10 is arranged to separate the machining chamber A and a column-side space (not illustrated) receiving the entire column and the base end side of the spindle head 9. The protective cover 10 is configured by connecting a plurality of cover panels (not illustrated) to a pantograph mechanism (not illustrated) arranged behind the cover planes. Accordingly, the protective cover 10 separates the machining chamber A and the column-side space while allowing the spindle head 9 to move in the X-axis and Y-axis plane.

The workpiece support device 3 supports a workpiece (not illustrated) to be machined. Specifically, the workpiece support device 3 has a tilt table 31, a support base 32, and a turntable 33. The tilt table 31 is supported by the support base 32 and is swingable about the X-axis. The turntable 33 is arranged on the top of the tilt table 31. On the top of the turntable 33, a pallet P for attaching a workpiece thereto is fixed by clamping. The support base 32 is supported on the top of a front end of the bed 11 and is movable in a front-rear direction (Z-axis direction). The movement of the support base 32 in the Z-axis direction is carried out by a feed drive mechanism (not illustrated) including a ball screw and a servo motor driving the ball screw.

In machining a workpiece, the feed drive mechanisms in the X-axis direction, the Y-axis direction, and the Z-axis direction and drive mechanisms for the tilt table 31 and the turntable 33 are controlled by the controller 100, so that relative positional relation between the workpiece and a tool T1 or tool T2 attached to the distal end of the spindle 2 is controlled. Thereby, the workpiece is machined into a desired shape.

[Structure of Outer Cover]

The outer cover 6 has a first cover unit 61, a second cover unit 62, and a third cover unit 63. The first cover unit 61 includes a ceiling cover 61*a* and a right side wall cover 61*b* that are formed to surround the machining chamber A. The second cover unit 62 covers a stocker receiving space B that receives the standard tool stocker 7. The third cover unit 63 covers the column-side space (not illustrated) that receives the entire column and the base end side of the spindle head 9.

The first cover unit 61 includes another side wall cover (not illustrated) arranged on the front side. This front side wall cover has a front opening formed therein through which operations such as loading/unloading of a workpiece are performed. This front opening is opened and closed by a movable door (not illustrated) that is slidable in the left-right direction.

The right side wall cover 61*b* of the first cover unit 61 has a right opening 61*c* (see FIG. 10) formed therein that corresponds to the third opening through which setup of a tool T2 to be stored in the long-length tool stocker 8 is performed. The right opening 61*c* is formed at a position higher than the floor on which the machine tool 1 is installed. Accordingly, a platform 12 is provided on the right of the machine tool 1 to form a scaffold at the same height as the lower end position of the right opening 61*c*. The platform 12 has formed on the front face thereof steps 12*a* for a worker W to walk up to the top (scaffold) of the platform 12. The top of the platform 12 corresponds to the predetermined working area.

Figure 10:
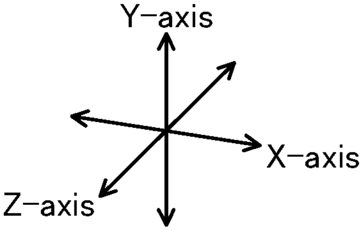
FIG. 10 is a view similar to FIG. 1 but showing a state where the tool holding unit of the tool conveyance mechanism is positioned at the position for work.
Figure 10:
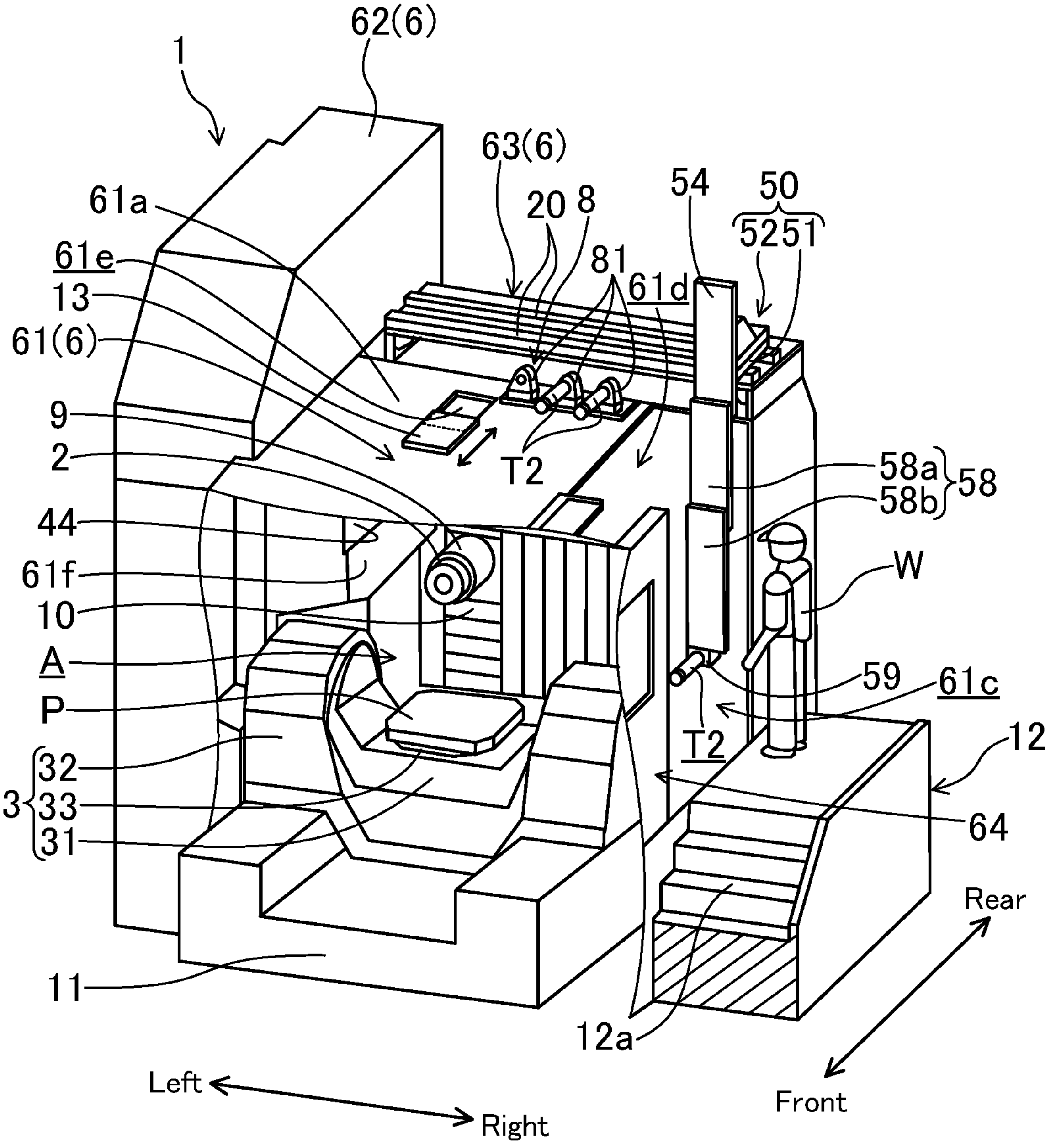

The right opening 61*c* has a rectangular shape with the top side opened as viewed from the right side of the machine tool 1 (see FIG. 10). The top-side end of the right opening 61*c* connects to a ceiling opening 61*d* formed in the ceiling cover 61*a* of the first cover unit 61. The ceiling cover 61*a* is arranged to cover the top of the machining chamber A, and the ceiling opening 61*d* is formed in the right end of the ceiling cover 61*a*. The ceiling opening 61*d* has a rectangular shape with the right side opened as viewed from the top side.

The right opening 61*c* and the ceiling opening 61*d* are opened and closed by a single movable door 64 that is slidable in the front-rear direction. The movable door 64 has a door body part 64*a* and a ceiling door part 64*b*. The door body part 64*a* opens and closes the right opening 61*c*. The ceiling door part 64*b* opens and closes the ceiling opening 61*d*. The door body part 64*a* is composed of a vertically extending rectangular plate and has a window 64*d* in the vicinity of the center thereof. The window 64*d* is closed by a transparent plate. The ceiling door part 64*b* has a rectangular plate shape and horizontally protrudes leftward from the top-side edge of the door body part 64*a*.

Figure 3:
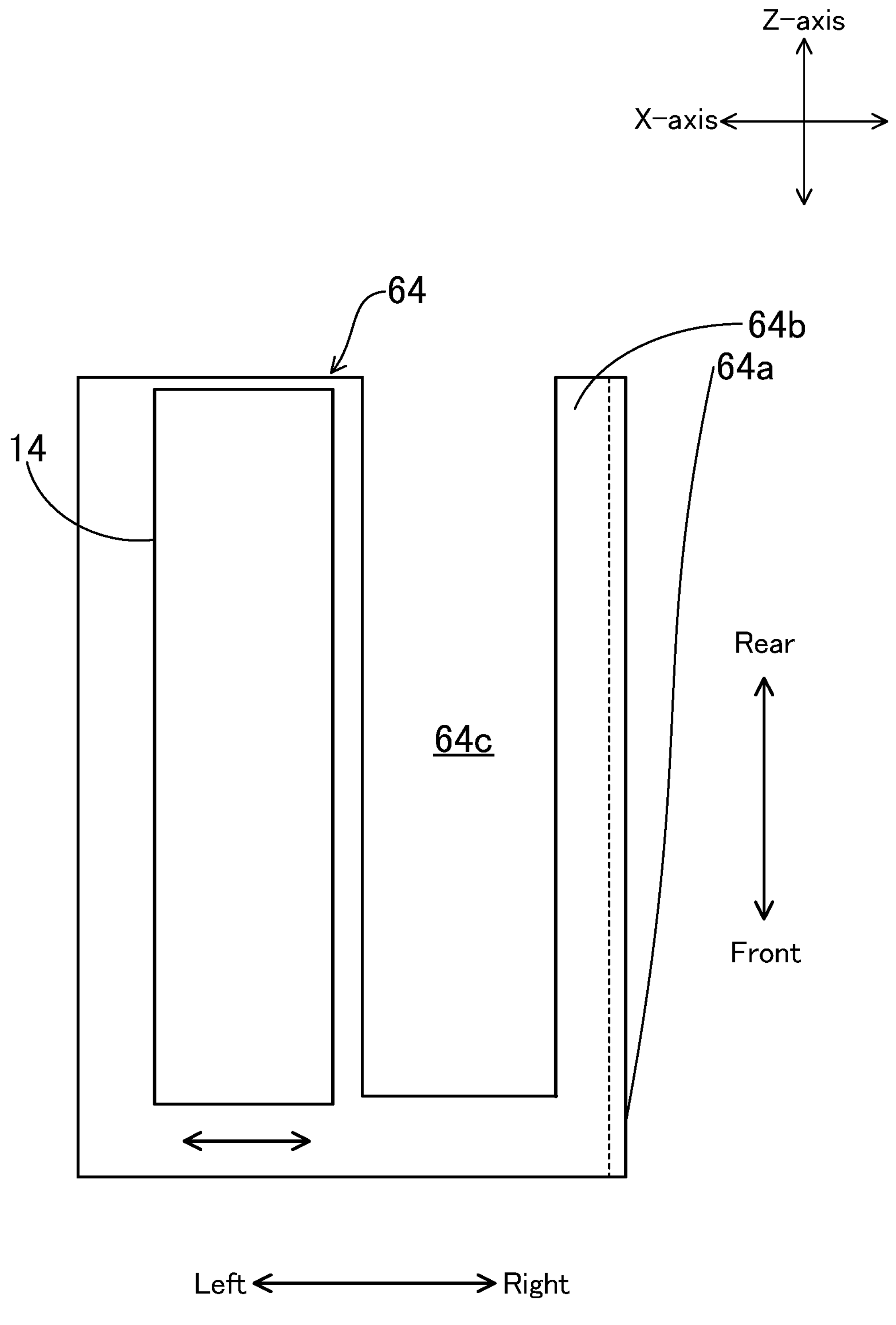
FIG. 3 is a top view of an opening and closing mechanism for opening and closing a right opening of the machine tool.

As illustrated in FIG. 3, the ceiling door part 64*b* of the movable door 64 has an opening 64*c* as the second opening formed therein. The opening 64*c* allows an up-and-down slider 58 of the tool conveyance mechanism 50, which is described later, to pass therethrough. The opening 64*c* is formed in a rectangular shape extending in the front-rear direction with the rear side opened. The opening 64*c* is opened and closed by an opening and closing shutter 14 (an example of the opening and closing member) that is slidable in the left-right direction. The opening and closing shutter 14 is mounted on the top of the ceiling door part 64*b* together with a driving actuator therefor. The opening and closing shutter 14 and the driving actuator constitute the second opening and closing mechanism. The driving actuator is operationally controlled by the controller 100 that is described later.

When the movable door 64 is positioned at a closed position as shown in FIG. 1, the ceiling opening 61*d* formed in the ceiling cover 61*a* is closed by the ceiling door part 64*b* and the right opening 61*c* formed in the side wall cover 61*b* is closed by the door body part 64*a*. When the movable door 64 is moved frontward to be positioned at an open position as shown in FIG. 10, both the ceiling opening 61*d* formed in the ceiling cover 61*a* and the right opening 61*c* formed in the side wall cover 61*b* are opened.

Three tool pots 81 as constituent elements of the long-length tool stocker 8 are arranged on the left of the ceiling opening 61*d* on the top of the ceiling cover 61*a*. These three tool pots 81 are arranged at regular intervals in the left-right direction. The number of tool pots 81 in this example is three; however, the present invention is not limited thereto. The number of tool pots 81 may be two or less or may be four or more.

Each tool pot 81 has a pot body and a trapezoidal support supporting the pot body from below. The pot body has a tool insertion hole that is open to the front side and receives a shank of a tool T2. For example, the pot body has a built-in tool holding mechanism using a spring. This tool holding mechanism removably holds the shank of the tool T2 inserted in the tool insertion hole of the pot body.

The ceiling cover 61*a* has an opening 61*e* as the first opening formed therein on the left of the long-length tool stocker 8. The opening 61*e* allows the up-and-down slider 58 of the tool conveyance mechanism 50, which is described later, to pass therethrough. The opening 61*e* is opened and closed by an opening and closing shutter 13 (an example of the opening and closing member) that is slidable in the front-rear direction. The opening and closing shutter 13 is mounted on the top of the ceiling cover 61*a* together with a driving actuator therefor. The opening and closing shutter 13 and the driving actuator constitute the first opening and closing mechanism. The driving actuator is operationally controlled by the controller 100 that is described later. In the following description, the opening 61*e* formed in the ceiling cover 61*a* and the opening 64*c* formed in the ceiling door part 64*b* of the movable door 64 are referred to as "the first opening 61*e*" and "the second opening 64*c*", respectively.

Referring to FIG. 2, the stocker receiving space B covered by the second cover unit 62 receives two tool magazines 71 that are of a rotary type and constitute the standard tool stocker 7.

The two tool magazines 71 are arranged coaxially with each other with a distance therebetween in the left-right direction. Each tool magazine 71 consists of a disk-shaped magazine frame and a large number of tool holding units 71*a* arranged adjacent to each other in the circumferential direction on the outer peripheral edge of the magazine frame. Each tool holding unit 71*a* has a groove shape which is open to the right side. Each tool holding unit 71*a* is configured to detachably hold a standard-size tool T1. Note that the tool magazine is not limited to this configuration and may employ any conventionally known configuration, for example, may have a configuration in which tool holding units are connected to each other by an endless chain so as to be rotationally movable.

[Configuration of Standard Tool Changer]

The standard tool changer 4 performs tool change between each tool magazine 71 and the spindle 2 under control by the controller 100. Specifically, the standard tool changer 4 has a tool change arm 41, a conveyance unit 42, and a conveyance rail 43.

The tool change arm 41 is received by an arm receiving space C that is located between the stocker receiving space B and the machining chamber A. The arm receiving space C and the machining chamber A are separated from each other by a partition wall 61*f*. The partition wall 61*f* forms a left side wall of the first cover unit 61 surrounding the machining chamber A. The partition wall 61*f* has an opening 61*g* formed therein through which the arm receiving space C and the machining chamber A communicate with each other so that the tool change arm can enter the machining chamber A. The opening 61*g* is openably closed by an ATC shutter 44 that is slidable in the up-down direction.

The conveyance rail 43 is arranged to extend in the left-right direction between a tool index position (predetermined angular position) in each tool magazine 71 and a position in the left vicinity of the tool change arm 41. The conveyance unit 42 conveys a next tool T1 indexed at the tool index position in each tool magazine 71 to a conveyance end position set on the left of the tool change arm 41. Once the conveyance unit 42 arrives at the conveyance end position, the ATC shutter 44 is opened and the tool change arm 41 rotates about its central support shaft as the fulcrum, thereby performing tool change for replacing a used tool T1 attached to the spindle 2 with the next tool T1 held by the conveyance unit 42. Through this tool change operation, the next tool T1 is attached to the spindle 2 and the used tool T1 is attached to the conveyance unit 42. Upon completion of the tool change operation by the tool change arm 41, the ATC shutter 44 is closed and the conveyance unit 42 is moved leftward along the conveyance rail 43 to return the used tool T1 to a predetermined one of the tool holding units 71*a* of the tool magazines 71.

[Long-Length Tool Changer]

The long-length tool changer 5 has a tool conveyance mechanism 50 for performing tool change between the long-length tool stocker 8 and the spindle 2. The tool conveyance mechanism 50 waits above the ceiling cover 61*a* of the machine tool 1 as shown in FIG. 1 while machining of a workpiece in accordance with an NC program is being performed.

Figure 4:
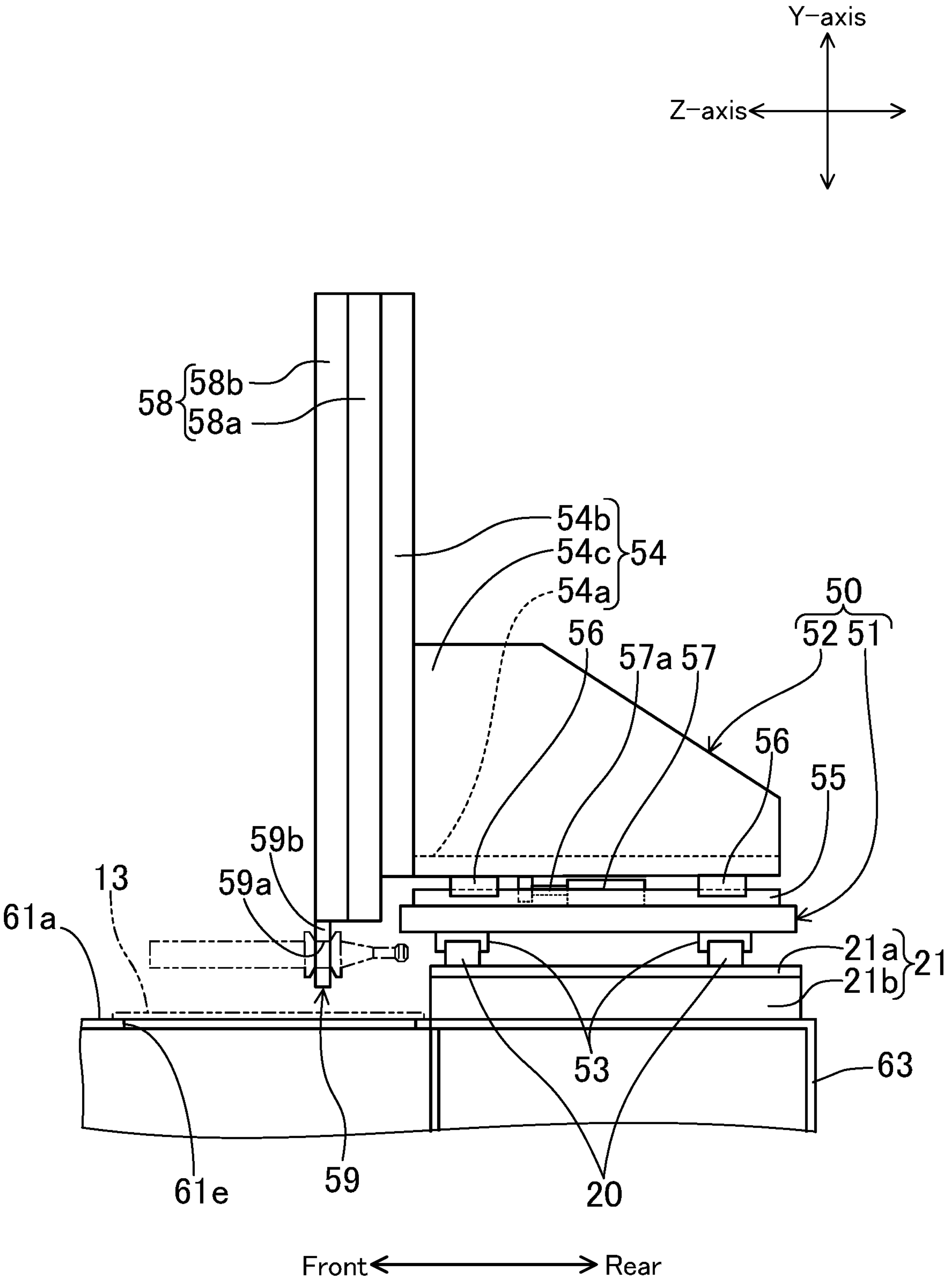
FIG. 4 is a right side view of the tool conveyance mechanism.
Figure 5:
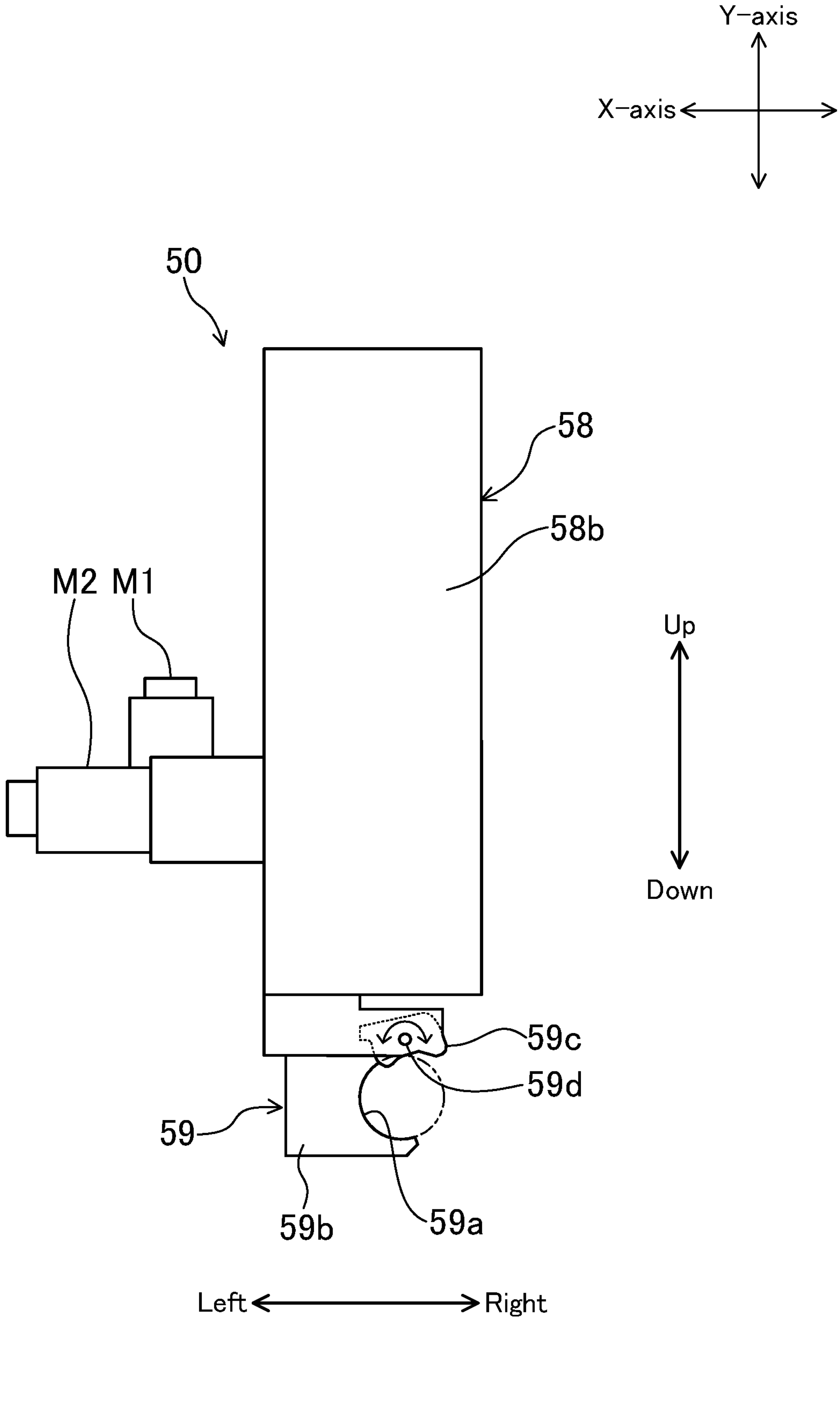
FIG. 5 is a front view of the tool conveyance mechanism.

FIG. 4 is a side view of the tool conveyance mechanism 50 as viewed from the left side. FIG. 5 is a front view of the tool conveyance mechanism 50 as viewed from the front side. The tool conveyance mechanism 50 includes a left-right movable base 51, an up-and-down and back-and-forth unit 52, an X-axis motor M1 (see FIG. 5), a Z-axis cylinder 57, and a Y-axis motor M2. The up-and-down and back-and-forth unit 52 is supported by the left-right movable base 51. The X-axis motor M1 drives the left-right movable base 51 in the left-right direction (X-axis direction). The Z-axis cylinder 57 drives the up-and-down and back-and-forth unit 52 in the front-rear direction (Z-axis direction). The Y-axis motor M2 drives extension and shortening of an up-and-down slider 58, which is arranged on the up-and-down and back-and-forth unit 52, in the up-down direction (Y-axis direction).

As illustrated in FIGS. 1 and 4, the left-right movable base 51 is composed of a rectangular plate with the longitudinal side along the front-rear direction. The left-right movable base 51 is movable in the left-right direction along a pair of guide rails 20. The pair of guide rails 20 is formed on the top of a support member 21. The support member 21 is arranged on the third cover unit 63 of the machine tool 1. The support member 21 has a horizontal plate part 21*a* and a pair of legs 21*b*. The horizontal plate part 21*a* extends throughout the length of the third cover unit 63 in the left-right direction. The pair of legs 21*b* supports the ends of the horizontal plate part 21*a*.

As illustrated in FIG. 4, the left-right movable base 51 is supported via sliders 53 on the pair of guide rails 20. The sliders 53 are respectively engaged with the guide rails 20 and are movable in the left-right direction. The left-right movable base 51 moves in the left-right direction along the pair of guide rails 20 along with the sliders 53.

The X-axis motor M1 is fixed to the left end of the left-right movable base 51. The X-axis motor M1 is arranged with an output shaft thereof directed vertically downward. The output shaft of the X-axis motor M1 has a pinion gear attached to the distal end thereof. The guide rail 20 located on the front side has a rack bar attached to a side surface thereof. The rack bar extends throughout the length of the guide rail 20 in the left-right direction and meshes with the pinion gear. The X-axis motor M1 rotates the pinion gear meshing with the rack bar, thereby driving the left-right movable base 51 in the left-right direction along with the pinion gear. The X-axis motor M1 is operationally controlled by the controller 100 that is described later.

The left-right movable base 51 has a pair of left and right guide rails 55 (only one of which is shown in FIG. 4) on the top thereof. The pair of guide rails 55 guides the up-and-down and back-and-forth unit 52 such that the up-and-down and back-and-forth unit 52 is movable in the front-rear direction. The pair of guide rails 55 extends almost throughout the length of the left-right movable base 51 in the front-rear direction on the top of the left-right movable base 51.

The up-and-down and back-and-forth unit 52 has a base member 54 and the up-and-down slider 58. The base member 54 has an L-shape as viewed in the left-right direction. The up-and-down slider 58 is attached to the base member 54.

The base member 54 has a horizontal plate 54*a*, a vertical plate 54*b*, and a pair of ribs 54*c* (only one of which is shown in FIG. 4). The horizontal plate 54*a* has a rectangular shape with the longitudinal side along the front-rear direction. The vertical plate 54*b* extends upward from the front edge of the horizontal plate 54*a*. The ribs 54*c* each have a substantially trapezoidal plate shape and respectively connect the left and right edges of the horizontal plate 54*a* to a rear surface of the vertical plate 54*b*. The horizontal plate 54*a* of the base member 54 is supported via sliders 56 on the pair of left and right guide rails 55 arranged on the top of the left-right movable base 51. The sliders 56 are arranged two by two on the guide rails 55, i.e., four sliders 56 in total are arranged on the guide rails 55. The sliders 56 are engaged with the guide rails 55 and are movable in the front-rear direction. The base member 54 is movable in the front-rear direction along the pair of guide rails 55 along with the sliders 56.

Between the pair of guide rails 55 on the top of the left-right movable base 51, the Z-axis cylinder 57 is fixed. The Z-axis cylinder 57 drives back-and-forth movement of the up-and-down and back-and-forth unit 52 as a whole in the front-rear direction. The Z-axis cylinder 57 is composed of a hydraulic cylinder that hydraulically drives a rod 57*a* in the front-rear direction (Z-axis direction). The distal end of the rod 57*a* is fixed to a bottom surface of the base member 54 of the up-and-down and back-and-forth unit 52. The Z-axis cylinder 57 is operationally controlled by switching between hydraulic flow paths of a hydraulic pressure supply device, not illustrated, by the controller 100.

The up-and-down slider 58 is attached to a front surface of the vertical plate 54*b* of the base member 54. In this embodiment, the up-and-down slider 58 has a two-stroke mechanism. Specifically, the up-and-down slider 58 has a first slide unit 58*a* and a second slide unit 58*b*. The second slide unit 58*b* is arranged to overlap a front face of the first slide unit 58*a*. The first slide unit 58*a* and the second slide unit 58*b* are each formed in a rectangular plate shape with the longitudinal side along the up-down direction. The first slide unit 58*a* and the second slide unit 58*b* each have a rack plate fixed thereto that extends in the up-down direction. The first slide unit 58*a* and the second slide unit 58*b* overlap each other with a pinion gear meshing with the rack plates thereof. In this two-stroke mechanism, moving the first slide unit 58*a* downward causes the second slide unit 58*b* to slide downward relative to the first slide unit 58*a* moving downward, whereby they are extended as a whole. On the other hand, moving the first slide unit 58*a* upward causes the second slide unit 58*b* to move upward relative to the first slide unit 58*a* moving upward, whereby they are shortened as a whole. Thus, as compared to a slider not using such a two-stroke mechanism, the amount of stroke of the up-and-down slider 58 as extended is doubled without increase in the length of the up-and-down slider 58 as shortened.

The Y-axis motor M2 (see FIG. 5) is a drive source for driving up-and-down movement of the up-and-down slider 58. The Y-axis motor M2 is supported to be movable in the up-down direction with respect to the base member 54. The Y-axis motor M2 is arranged such that its output shaft horizontally extends in the left-right direction. The Y-axis motor M2 drives up-and-down movement of the first slide unit 58*a* in the up-down direction via a gear mechanism. Since the first slide unit 58*a* is connected via the two-stroke mechanism to the second slide unit 58*b* as described above, the second slide unit 58*b* is driven and moved up and down in conjunction with the first slide unit 58*a* being driven and moved up and down by the Y-axis motor M2. The Y-axis motor M2 is operationally controlled by the controller 100 that is described later.

The second slide unit 58*b* of the up-and-down slider 58 has at the lower end thereof a tool holding unit 59 for holding a long-length tool T2.

As illustrated in FIG. 5, the tool holding unit 59 has an engagement plate 59*b* and a lock mechanism. The engagement plate 59*b* has an engagement portion 59*a* having an arcuate shape which is open to the right side as illustrated in FIG. 5. The lock mechanism includes a lock plate 59*c*. The lock plate 59*c* is supported at a portion above the engagement portion 59*a* on the engagement plate 59*b* such that it is turnable about a shaft 59*d* as the fulcrum. The lock mechanism switches the lock plate 59*c* between a locking position and an unlocking position by controlling the supply of hydraulic pressure to a hydraulic flow path formed in the engagement plate 59*b*. When switched into the locking position, the lock plate 59*c* turns clockwise in FIG. 5 about the shaft 59*d* as the fulcrum. Thereby, a tool T2 is interlocked with the engagement portion 59*a* by the lock plate 59*c* so as not to fall out. When switched into the unlocking position, the lock plate 59*c* rotates counterclockwise in FIG. 5 about the shaft 59*d* as the fulcrum. Thereby, a tool T2 can be horizontally inserted into or pulled out from the engagement portion 59*a* through the open right side of the engagement portion 59*a*.

[Description of Stand-by Position, Tool Change Position, Stocker Position, and Position for Work]

The tool conveyance mechanism 50 is configured to be able to move the tool holding unit 59 arranged at the lower end of the up-and-down slider 58 to a stand-by position (see FIG. 2), a tool change position (see FIG. 6), a stocker position (see FIG. 7), and a position for work (see FIG. 8) by combining movement of the left-right movable base 51 in the left-right direction and up-and-down movement (extension and shortening) of the up-and-down slider 58 in the up-down direction.

The stand-by position is a position for the tool holding unit 59 to wait until a request of conveyance of a tool T2 is made to the tool conveyance mechanism 50. FIG. 2 shows a state where the tool holding unit 59 is positioned at the stand-by position. The tool holding unit 59 at the stand-by position is situated directly above the first opening 61*e* formed in the ceiling cover 61*a*.

The position in the left-right direction (X-axis direction) and the front-rear direction (Z-axis direction) of the stand-by position is set such that a long-length tool T2 held by the tool holding unit 59 passes through the first opening 61*e* without interference with the first opening 61*e* when the tool holding unit 59 is moved downward in the Y-axis direction from the stand-by position into the machining chamber A by the up-and-down slider 58.

Further, the position in the height direction of the stand-by position is set such that the lower end of the tool holding unit 59 is situated at a position higher than the tool pots 81 of the long-length tool stocker 8. Thereby, the movement path for moving the tool holding unit 59 from the stand-by position to the stocker position is simplified so that the time required for the moving operation is reduced.

When the tool holding unit 59 is positioned at the stand-by position, the up-and-down and back-and-forth unit 52 has been retracted by the Z-axis cylinder 57. Therefore, it is unnecessary to retract the up-and-down and back-and-forth unit 52 with the Z-axis cylinder 57 before moving the tool holding unit 59 from the stand-by position to the stocker position or the tool change position to cause the tool holding unit 59 to hold (engage) a tool T2. Consequently, the time required for the tool conveyance mechanism 50 to cause the tool holding unit 59 to hold the tool T2 is reduced.

Figure 6:
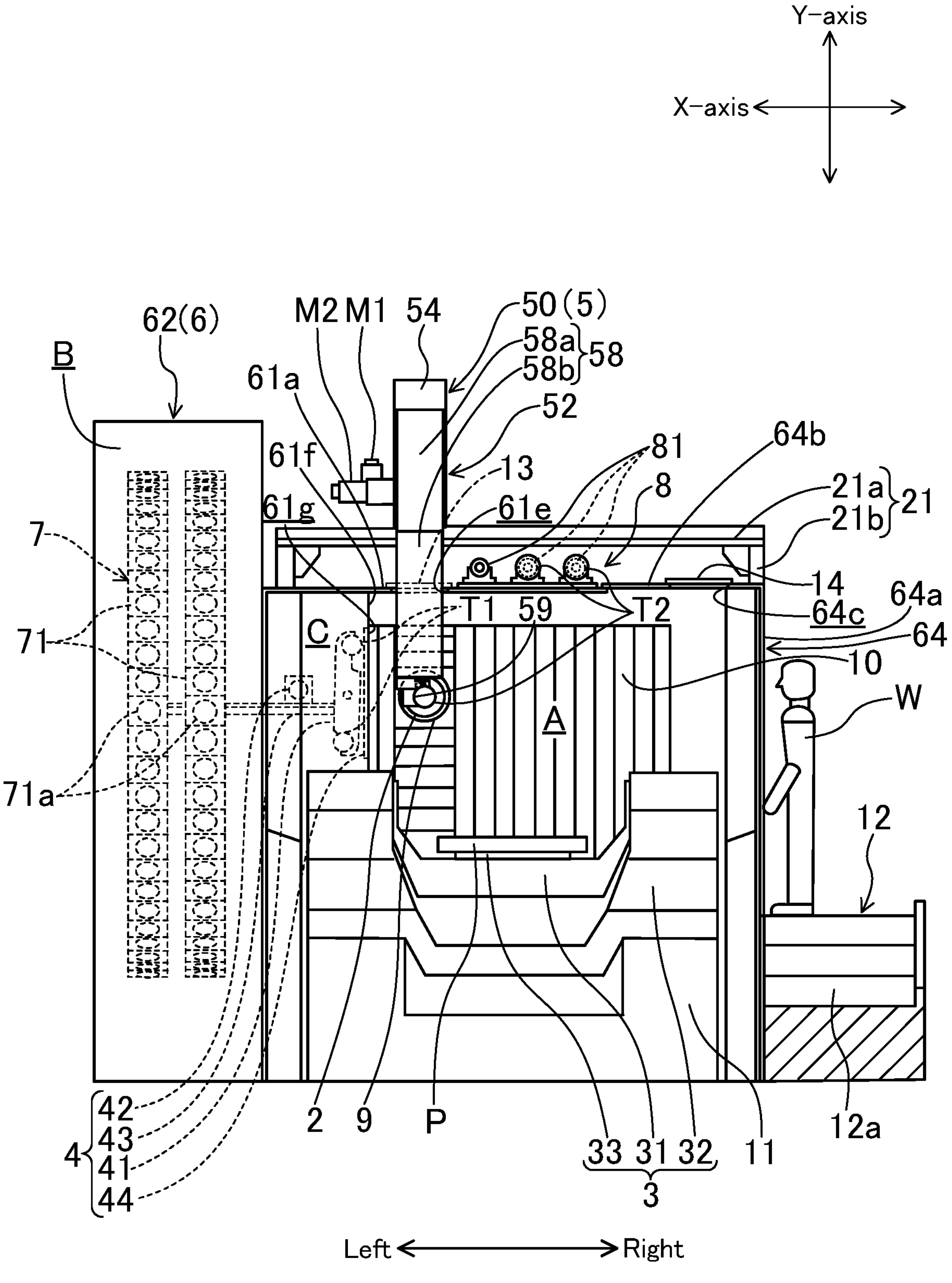
FIG. 6 is a front view showing a state where the tool holding unit of the tool conveyance mechanism is positioned at a tool change position.

The tool change position is a position for transferring a tool T2 between the spindle 2 and the tool holding unit 59. FIG. 6 shows a state where the tool holding unit 59 is positioned at the tool change position. When the tool holding unit 59 is positioned at the tool change position, a tool T2 attached to the spindle 2 enters and engages the engagement portion 59*a* and thereby the engagement portion 59*a* is arranged coaxially with the spindle 2. The transfer (insertion and pulling) of a tool T2 between the tool holding unit 59 and the spindle 2 is carried out by back-and-forth movement in the Z-axis direction by the Z-axis cylinder 57 and reciprocation in the X-axis direction by the X-axis motor M1. Note that the position of the spindle 2 for this tool change is previously determined. Further, for this tool change position, a position the tool holding unit 59 reaches when moved slightly leftward in the X-axis direction to release the tool T2 from the engagement portion 59*a* is designated as an approach position.

Figure 7:
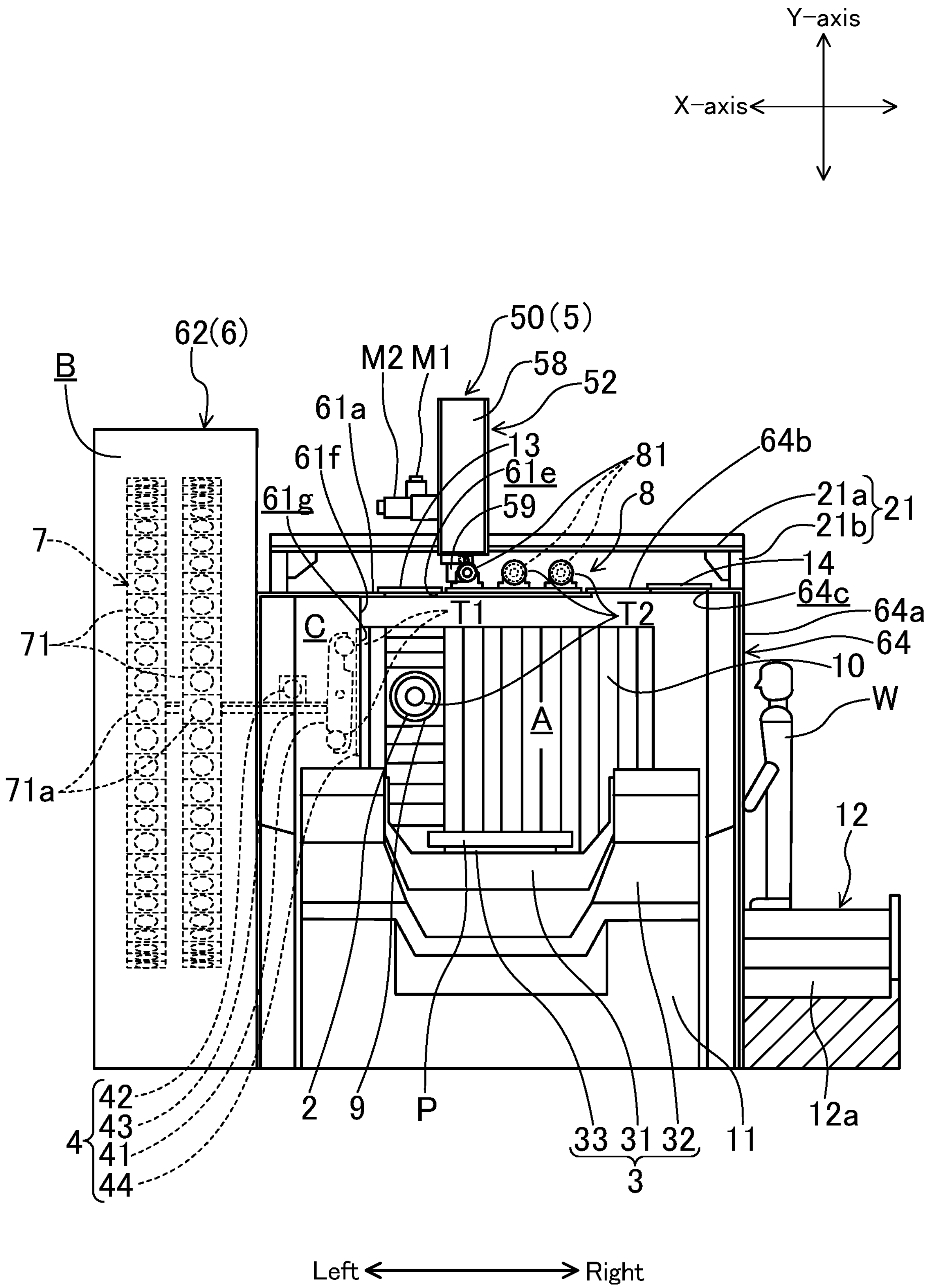
FIG. 7 is a front view showing a state where the tool holding unit of the tool conveyance mechanism is positioned at a stocker position.

The stocker position is a position for transferring a tool T2 between the long-length tool stocker 8 and the tool holding unit 59. FIG. 7 shows an example state where the tool holding unit 59 is positioned at the stocker position. When the tool holding unit 59 is positioned at the stocker position, a tool T2 attached to the tool pot 81 of the long-length tool stocker 8 enters and engages the engagement portion 59*a* and thereby the engagement portion 59*a* is arranged coaxially with the tool pot 81. In this embodiment, since three tool pots 81 are provided, three stocker positions in total are set respectively corresponding to the three tool pots 81. In the example shown in FIG. 7, the tool holding unit 59 is positioned at the stocker position set corresponding to the leftmost one of the tool pots 81. The transfer (insertion and pulling) of a tool T2 between the tool holding unit 59 and the tool pot 81 is also carried out by back-and-forth movement in the Z-axis direction by the Z-axis cylinder 57 and reciprocation in the X-axis direction by the X-axis motor M1. Further, for each of the stocker positions, a position the tool holding unit 59 reaches when moved slightly leftward in the X-axis direction to release the tool T2 from the engagement portion 59*a* is designated as an approach position.

Figure 8:
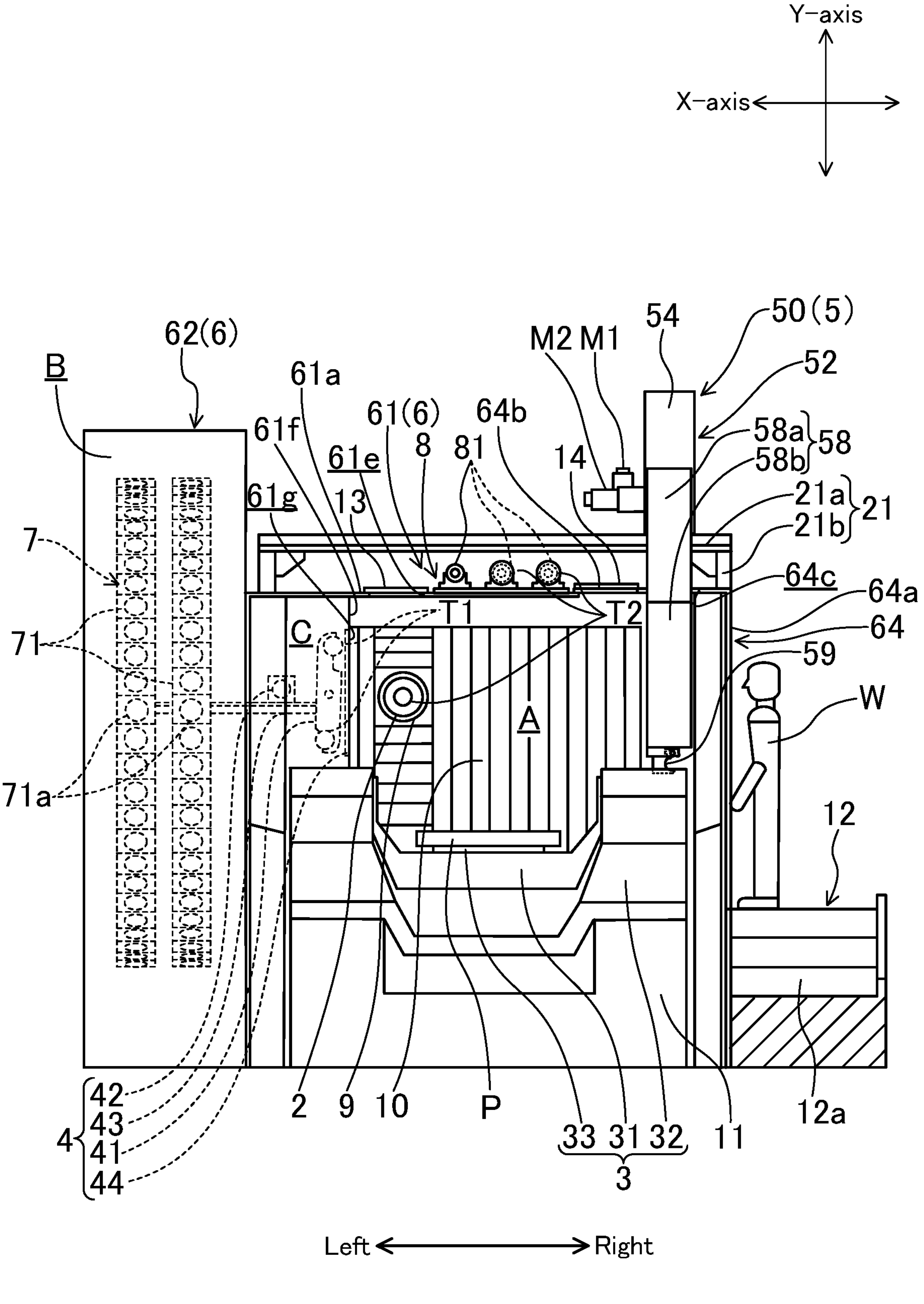
FIG. 8 is a front view showing a state where the tool holding unit of the tool conveyance mechanism is positioned at a position for work.

The position for work is a position for allowing a worker W to access the tool holding unit 59 from the top of the platform 12 (predetermined working area) provided on the right of the machine tool 1 to perform attachment/removal of a tool T2. FIG. 8 shows a state where the tool holding unit 59 is positioned at the position for work. The tool holding unit 59 positioned at the position for work is situated directly below the second opening 64*c* formed in the ceiling door part 64*b* of the movable door 64. The tool holding unit 59 positioned at the position for work is spaced slightly to the left from the right opening 61*c*. Further, the tool holding unit 59 positioned at the position for work is preferably situated at a height nearly equal to the average adult male waist height.

[Configuration of Control System]

FIG. 9 is a block diagram partially illustrating a control system of the machine tool 1. As illustrated in FIG. 9, the machine tool 1 includes a controller 100. The controller 100 is composed of a computer including a CPU, a ROM, and a RAM. The controller 100 is connected to a machining mechanism unit 101, the standard tool changer 4, the long-length tool changer 5, a shutter drive unit 102, a main operation panel 103, and a setup operation unit 104 so as to transmit and receive signals to and from them.

The machining mechanism unit 101 includes the feed drive mechanisms in the X-axis, Y-axis, and Z-axis directions, the drive mechanisms for the tilt table 31 and the turntable 33, and a spindle motor driving the spindle 2.

The standard tool changer 4 performs the tool change for a standard-size tool T1 with the tool change arm 41 as described above. The controller 100 drives actuators (such as a drive motor for the tool change arm 41) for the standard tool changer 4, thereby causing the standard tool changer 4 to perform the tool change.

The long-length tool changer 5 performs the tool change for a long-length tool T2 with the tool conveyance mechanism 50. This long-length tool changer 5 also performs setup in addition to the tool change, which is descried later. The controller 100 is electrically connected to actuators for the tool conveyance mechanism 50. The actuators for the tool conveyance mechanism 50 include, for example, the X-axis motor M1 driving the left-right movable base 51, the Y-axis motor M2 driving the up-and-down slider 58, and a flow path switching valve of the hydraulic pressure supply device connected to the Z-axis cylinder 57. The X-axis motor M1 and the Y-axis motor M2 change the position of the up-and-down and back-and-forth unit 52 in an X-axis and Y-axis plane, thereby changing the position of the tool holding unit 59 arranged at the lower end of the up-and-down slider 58 in the X-axis and Y-axis plane.

The shutter drive unit 102 includes the driving actuator for the opening and closing shutter 13 for the first opening 61*e* formed in the ceiling cover 61*a* and the driving actuator for the opening and closing shutter 14 for the second opening 64*c* formed in the movable door 64. The controller 100 operationally controls these driving actuators.

The main operation panel 103 has a cycle start button 103*a* for starting execution of an NC program and a touch panel 103*b* for a worker W to make various settings of the machine tool 1. The touch panel 103*b* displays thereon soft keys for the worker W to input an NC program and set buttons for setting the running mode of the machine tool 1. For example, an option for the running mode of the machine tool 1 is an automatic running mode for machining a workpiece in accordance with an NC program. Another option for the running mode of the machine tool 1 is a setup mode for allowing the worker W to perform various setups. An example of the setups is setup of a tool T2 to be stored in the long-length tool stocker 8. The touch panel 103*b* has a setting screen for the worker W to specify the tool pot 81 holding the tool T2 as the setup target. Upon accepting operation of the cycle start button 103*a* or the touch panel 103*b*, the main operation panel 103 transmits an operation signal for the operation to the controller 100.

The setup operation unit 104 has a setup execution button 104*a* for causing the tool conveyance mechanism 50 to perform conveyance of a tool T2 with the setup mode set in the main operation panel 103. The setup execution button 104*a* is provided on a right side surface of the machine tool 1 so that it can be operated by the worker W standing on the top of the platform 12. Upon accepting operation of the setup execution button 104*a*, the setup operation unit 104 transmits an operation signal for the operation to the controller 100. Note that the setup operation unit 104 and the main operation panel 103 are shown only in the brock diagram of FIG. 9 and omitted in the other perspective views and front views.

Upon receiving the operation signal for the operation of the cycle start button 103*a* from the main operation panel 103, the controller 100 executes an NC program stored in a storage that is not illustrated. The controller 100 causes the machining mechanism unit 101 to carry out machining of a workpiece in accordance with the NC program. Upon extracting a change command for a standard-size tool T1 during the execution of the NC program, the controller 100 causes the standard tool changer 4 to carry out the tool change operation. In this tool change operation, the standard tool changer 4 performs tool change between the spindle 2 and the conveyance unit 42 with the tool change arm 41 as described above.

Upon extracting a change command for a long-length tool T2 during the execution of the NC program, the controller 100 (an example of the conveyance control unit) causes the long-length tool changer 5 (the tool conveyance mechanism 50) to carry out the tool change operation. Upon receiving the operation signal for the operation of the setup execution button 104*a* from the setup operation unit 104, the controller 100 causes the long-length tool changer 5 (the tool conveyance mechanism 50) to carry out the setup operation.

[Tool Change Operation]

The tool change operation to be carried out by the long-length tool changer 5 is described in detail with reference to FIGS. 2, 6, and 7. This tool change operation is started with the tool holding unit 59 positioned at the stand-by position as shown in FIG. 2. First of all, the opening and closing shutter 13 mounted on the ceiling cover 61*a* of the machine tool 1 is moved to the open position by the shutter drive unit 102 under control by the controller 100. Thereby, the first opening 61*e* located directly below the stand-by position for the tool holding unit 59 is opened. With the first opening 61*e* opened, driving of the X-axis motor M1, the Y-axis motor M2, and the Z-axis cylinder 57 is controlled. Thereby, the tool holding unit 59 is moved in the X-axis, Y-axis, and Z-axis directions so that the tool change operation is carried out. In the following description, only the operation of the tool holding unit 59 is described. The tool holding unit 59 is first moved downward to a predetermined position through the first opening 61*e*. In this embodiment, the predetermined position is the approach position for the tool change position. Subsequently, the tool holding unit 59 is moved rightward in the X-axis direction to be positioned at the tool change position (see FIG. 6). Thereby, a used tool T2 enters the engagement portion 59*a* of the engagement plate 59*b*. Thereafter, the lock plate 59*c* is switched into the locking position so that the used tool T2 is held by the tool holding unit 59. Subsequently, the tool holding unit 59 is moved frontward in the Z-axis direction so that the used tool T2 is pulled out frontward from a tool attachment hole of the spindle 2.

Subsequently, the tool holding unit 59 is moved upward in the Y-axis direction to be moved out of the machining chamber A through the first opening 61*e*, and then is moved to the front of an empty tool pot 81 as a storage destination in the long-length tool stocker 8 (a position located in front of the stocker position for the empty tool pot 81 in the Z-axis direction) (see FIG. 7). Subsequently, the tool holding unit 59 is moved rearward in the Z-axis direction to the stocker position. Thereby, the used tool T2 held by the tool holding unit 59 is inserted into the empty tool pot 81. Thereafter, the lock plate 59*c* of the tool holding unit 59 is switched into the unlocking position. Subsequently, the tool holding unit 59 is moved leftward in the X-axis direction to the approach position so that the tool holding unit 59 is moved away from the stored used tool T2.

Subsequently, the tool holding unit 59 is moved upward in the Y-axis direction to be positioned at the same height as the stand-by position, and then is moved to a position above the approach position for another tool pot 81 that holds a next tool T2. Subsequently, the tool holding unit 59 is moved downward in the Y-axis direction to the approach position and then is moved rightward in the X-axis direction to the stocker position for the tool pot 81. Thereby, the next tool T2 enters the engagement portion 59*a* of the engagement plate 59*b*. Thereafter, the lock plate 59*c* is switched into the locking position so that the next tool T2 is held by the tool holding unit 59. Subsequently, the tool holding unit 59 is moved frontward in the Z-axis direction so that the next tool T2 is pulled out from the tool pot 81.

Subsequently, the tool holding unit 59 is moved to a position above the spindle 2 at which the held next tool T2 is situated in front of the spindle 2 in the Z-axis direction. Thereafter, the tool holding unit 59 is moved into the machining chamber A through the first opening 61*e* and positioned such that the next tool T2 held by the holding unit 59 is arranged coaxially with the spindle 2. Subsequently, the tool holding unit 59 is moved rearward in the Z-axis direction to the tool change position so that the next tool T2 held by the tool holding unit 59 is inserted into the tool attachment hole of the spindle 2.

Thereafter, the lock plate 59*c* of the tool holding unit 59 is switched into the unlocking position. Subsequently, the tool holding unit 59 is moved leftward in the X-axis direction to the approach position. Thereby, the next tool T2 is transferred from the tool holding unit 59 to the spindle 2 and attached to the spindle 2. Subsequently, the tool holding unit 59 is moved upward in the Y-axis direction to be returned to the stand-by position (see FIG. 2). Thus, the tool change operation for replacing the used tool T2 attached to the spindle 2 with the next tool T2 is carried out. Upon completion of this tool change operation, the opening and closing shutter 13 is returned to the closed position by the shutter drive unit 102. Thereby, the first opening 61*e* is closed by the opening and closing shutter 13, so that the machining chamber A and the space located on the long-length tool stocker 8 side are completely separated.

[Setup Operation]

Next, the setup operation to be carried out by the tool conveyance mechanism 50 of the long-length tool changer 5 is described in detail with reference to FIGS. 2, 7, and 8. In the setup operation, first of all, the controller 100 identifies, based on the operation signal received from the main operation panel 103, the tool pot 81 as the setup target (the tool pot 81 holding the tool T2 to be unloaded), which is specified by the worker W, from the thee tool pots 81 of the long-length tool stocker 8. Upon completion of the identification of the tool pot 81, the tool holding unit 59 is moved rightward in the X-axis direction from the stand-by position (see FIG. 2) to be positioned at a position above the approach position for the identified tool pot 81. Subsequently, the tool holding unit 59 is moved downward in the Y-axis direction to the approach position and then is moved rightward in the X-axis direction to the stocker position for the identified tool pot 81 (see FIG. 7). Thereby, the tool T2 as the setup target enters the engagement portion 59*a* of the engagement plate 59*b*. Thereafter, the lock plate 59*c* of the tool holding unit 59 is switched into the locking position so that the tool T2 to be unloaded as the setup target is held by the tool holding unit 59. Subsequently, the tool holding unit 59 is moved frontward in the Z-axis direction so that the tool T2 to be unloaded is pulled out from the tool pot 81.

Subsequently, the opening and closing shutter 14 mounted on the ceiling door part 64*b* of the movable door 64 is moved to the open position so that the second opening 64*c* formed in the ceiling door part 64*b* is opened (see FIG. 8). Subsequently, the tool holding unit 59 is moved from the stocker position (see FIG. 7) to a position above the position for work (see FIG. 8) located directly below the second opening 64*c* and then is moved downward to the position for work through the second opening 64*c*.

Note that the movable door 64 is locked by a lock device, not illustrated, under control by the controller 100 so as not to be moved until completion of the movement of the tool holding unit 59 to the position for work. The lock by the lock device is released by the controller 100 after the completion of the movement of the tool holding unit 59 to the position for work. Thus, the worker W can move the movable door 64 in the opening direction so as to perform work on the tool holding unit 59 positioned at the position for work (see FIG. 10). As illustrated in FIG. 3, the second opening 64*c* formed in the ceiling door part 64*b* of the movable door 64 is open at the rear side in the Z-axis direction. Therefore, the ceiling door part 64*b* and the up-and-down slier 58 of the tool conveyance mechanism 50 do not interfere with each other when the movable door 64 is slid frontward to be opened.

The worker W can remove the tool T2 to be unloaded as the setup target from the tool holding unit 59 positioned at the position for work and then attach a new tool T2 to the tool holding unit 59. Once the worker W presses the setup execution button 104*a* after completing the attachment of the new tool T2 to the tool holding unit 59, the setup operation (tool change operation) by the tool conveyance mechanism 50 is resumed.

In the resumed setup operation, the tool holding unit 59 is moved to the front of the tool pot 81 that used to hold the unloaded tool T2 (the tool pot 81 identified by the controller 100). After moved thereto, the tool holding unit 59 is moved rearward in the Z-axis direction to the stocker position. Thereafter, the lock plate 59*c* of the tool holding unit 59 is switched into the unlocking position. Subsequently, the tool holding unit 59 is moved leftward in the X-axis direction to the approach position. Thereby, the new tool T2 is transferred from the tool holding unit 59 to the tool pot 81 and held by the tool pot 81. Thus, the setup operation for replacing the tool T2 to be unloaded with the new tool T2 is carried out. Where there are two or more tools T2 as the setup target, the above-described setup operation is carried out with respect to each of the tools T2.

After completion of the setup operation, the worker W performs on the main operation panel 103 an operation for ending the setup mode (e.g., switching to the automatic running mode), so that the operation signal for the operation is transmitted from the main operation panel 103 to the controller 100. Upon receiving the operation signal for ending the setup mode, the controller 100 drives an XY movement actuator Mxy of the tool conveyance mechanism 50 to return the tool holding unit 59 to the stand-by position.

[Functions and Effects in this Embodiment]

As described above, the machine tool 1 according to this embodiment includes the tool conveyance mechanism 50 that has the tool holding unit 59 for detachably holding a tool T2 and moves the tool holding unit 59 along the predetermined path. The tool conveyance mechanism 50 is configured to be able to move the tool holding unit 59 at least to the tool change position, the stocker position, and the position for work. The position for work is set at a position such that a worker W can perform attachment/removal of a tool T2 to/from the tool holding unit 59 from the top of the platform 12 (predetermined working area) provided on the right of the machine tool 1 (an example of the outside of the machine tool).

Accordingly, instead of by directly accessing the long-length tool stocker 8, the worker W can carry out setup of a tool T2 to the long-length tool stocker 8 by moving the tool holding unit 59 of the tool conveyance mechanism 50 to the position for work under control by the controller 100 and then performing attachment/removal of the tool T2 to/from the tool holding unit 59 (see FIG. 10). Therefore, the worker W does not need to enter the machining chamber A of the machine tool 1 or climb up to the top of the machine tool 1 and can easily and safely perform the setup of a tool T2 from the outside of the machine tool 1.

Further, the long-length tool stocker 8 n this embodiment is arranged outside the first cover unit 61 surrounding the machining chamber A. Specifically, the long-length tool stocker 8 is arranged on the top of the ceiling cover 61*a* covering the top of the machining chamber A.

This configuration prevents coolant and chips scattering during workpiece machining in the machining chamber A from adhering to the tools T2 stored in the long-length tool stocker 8. Therefore, the tools T2 are always kept clean, which enables avoidance of the problems such as defects in attachment of the tools T2 to the spindle 2 and defects in workpiece cutting. Further, the arrangement of the long-length tool stocker 8 on the top of the ceiling cover 61*a* achieves reduction of the cost required for safety measures. That is to say, for example, if the long-length tool stocker 8 is arranged on the same floor as where the worker W works, it is necessary to provide a safety fens surrounding the area where the long-length tool stocker 8 is arranged or provide a human detection sensor for entry detection to prevent the worker W from accidently entering the area. In this embodiment, the long-length tool stocker 8 is arranged on the top of the ceiling cover 61*a* of the machine tool 1 that is originally less likely to be approached by the worker W; therefore, the cost required for such safety measures is cut.

Further, the ceiling cover 61*a* in this embodiment has formed therein the first opening 61*e* for the tool holding unit 59 of the tool conveyance mechanism 50 to pass through when moved to the tool change position. Further, the ceiling door part 64*b* in this embodiment has formed therein the second opening 64*c* for the tool holding unit 59 of the tool conveyance mechanism 50 to pass through when moved to the position for work.

This configuration secures the movement path (the path between the tool change position, the stocker position, and the position for work) for the tool holding unit 59 with the long-length tool stocker 8 arranged on the top of the ceiling cover 61*a*.

Further, the machine tool 1 in this embodiment has the opening and closing shutter 13 opening and closing the first opening 61*e* and has the opening and closing shutter 14 opening and closing the second opening 64*c*. Opening and closing of these opening and closing shutters 13 and 14 are driven by the shutter drive unit 102.

Accordingly, during workpiece machining in the machining chamber A, the first opening 61*e* and the second opening 64*c* can be closed by driving the opening and closing shutters 13 and 14, which prevents chips and coolant from scattering out of the machining chamber A through the first opening 61*e* and the second opening 64*c*.

Further, the machine tool 1 in this embodiment has the right opening 61*c* and the ceiling opening 61*d* as an opening for work that are respectively formed in the right side wall cover 61*b* (i.e., the side wall cover 61*b* adjacent to the working area set on the top of the platform 12) and the ceiling cover 61*a* connected to the right side wall cover 61*b*. The right opening 61*c* and the ceiling opening 61*d* are opened and closed by the movable door 64.

Accordingly, when carrying out setup including attachment/removal of a heavy tool T2 to/from the tool holding unit 59 of the tool conveyance mechanism 50, the worker W can open the right opening 61*c* and the ceiling opening 61*d* by moving the movable door 64 frontward from the closed position to the open position (see FIG. 10), so that the worker W can carry out the setup using a hoisting device such as a crane through the opened ceiling opening 61*d*. Therefore, the physical load applied to the worker W in setup handling such a heavy tool T2 is reduced.

Further, the standard tool stocker 7 in this embodiment that stores standard-size tools T1 is arranged on the left of the machining chamber A. The position for work used for setup to the long-length tool stocker 8 is set on the side opposite to the tool magazines 71 (in this embodiment, on the right side) with the spindle 2 therebetween. Accordingly, for example, it is possible to allow a worker W to perform tool setup to the tool magazines 71 of the standard tool stocker 7 and at the same time allow another worker to perform tool setup to the long-length tool stocker 8.

Further, the long-length tool stocker 8 in this embodiment stores a long-length tool T2 that has a greater length than a tool T1 to be stored in the standard tool stocker 7. A long-length tool T2 is typically heavier than a standard-size tool T1; therefore, the physical load applied to the worker W in setup of a long-length tool T2 is greater than that in setup of a standard-size tool T1. In the machine tool 1 according to this embodiment, the worker W can carry out setup of a long-length tool T2 by moving the tool holding unit 59 of the tool conveyance mechanism 50 to the position for work and performing attachment/removal of the tool T2 to/from the tool holding unit 59 instead of by performing work directly on the long-length tool stocker 8; therefore, the physical load applied to the worker W in the setup is reduced.

Embodiment 2

Figure 11:
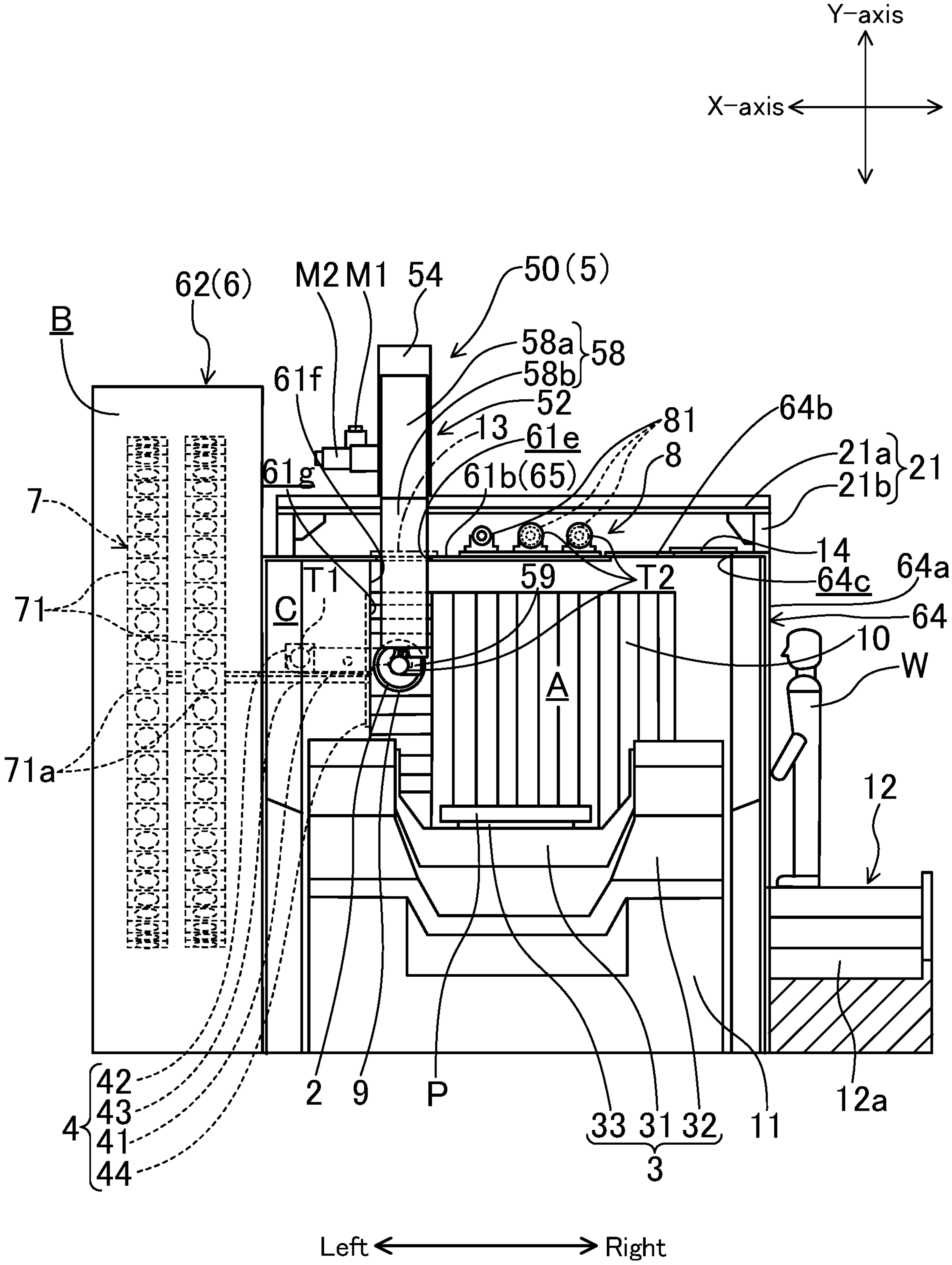
FIG. 11 is a view similar to FIG. 6 but illustrating a machine tool according to Embodiment 2.

FIG. 11 shows Embodiment 2 of the present invention. In this Embodiment, the position of the spindle 2 in positioning the tool holding unit 59 of the tool conveyance mechanism 50 at the tool change position is different from that in the above-described Embodiment 1. For easy understanding of the following description about the position of the spindle 2, FIG. 11 shows the state where the tool holding unit 59 of the tool conveyance mechanism 50 is positioned at the tool change position and the state where the tool change arm 41 of the standard tool changer 4 is performing the tool change operation (performing a rotational movement), with these two states overlapping each other; however, these two states actually never occur at the same time.

In this Embodiment 2, as illustrated in FIG. 11, the position of the spindle 2 in moving the tool holding unit 59 of the tool conveyance mechanism 50 to the tool change position and transferring a tool T2 between the tool holding unit 59 and the spindle 2 and the position of the spindle 2 in causing the tool change arm 41 of the standard tool changer 4 to perform the tool change operation are set at the same position.

Accordingly, for example, in causing the tool change arm 41 of the standard tool changer 4 to remove a used tool T1 from the spindle 2 and then moving the tool holding unit 59 of the tool conveyance mechanism 50 to the tool change position to attach a next tool T2 to the spindle 2, the spindle 2 does not need to be changed in position. Therefore, the amount of movement of the spindle 2 (the amounts of feed in the feed drive mechanisms in the X-axis and the Y-axis) is reduced, which enables shortening of the cycle time.

Other Embodiments

In the above-described embodiments, the long-length tool stocker 8 is constituted by a plurality of tool pots 81 arranged on the top of the ceiling cover 61*a* of the machine tool 1. The long-length tool stocker 8 is not limited to such a configuration. For example, the long-length tool stocker 8 may be constituted by a rotary tool magazine similar to those of the standard tool stocker 7 or may be constituted by a plurality of tool holding units connected to each other by an endless chain so as to be rotationally movable.

In the above-descried embodiments, the tool conveyance mechanism 50 is configured to be able to move the tool holding unit 59 to the stand-by position, the tool change position, the stocker position, and the position for work. The stand-by position is not necessarily required. For example, the stocker position may also serve as the stand-by position. That is to say, the tool conveyance mechanism 50 only needs to be configured to able to move the tool holding unit 59 at least to the tool change position, the stocker position, and the position for work.

In the above-described embodiments, the transfer of a tool T2 between the spindle 2 and the tool holding unit 59 of the tool conveyance mechanism 50 is carried out by back-and-forth movement of the up-and-down and back-and-forth unit 52 in the front-rear direction by the Z-axis cylinder 57. The present invention is not limited to this configuration. For example, the transfer of a tool T2 between the spindle 2 and the tool holding unit 59 may be carried out by moving the spindle 2 back and forth in the front-rear direction with the position of the tool holding unit 59 fixed.

In the above-described embodiments, the transfer of a tool T2 between each tool pot 81 of the long-length tool stocker 8 and the tool holding unit 59 of the tool conveyance mechanism 50 is carried out by back-and-forth movement of the up-and-down and back-and-forth unit 52 in the front-rear direction by the Z-axis cylinder 57. The present invention is not limited to this configuration. For example, the transfer of a tool T2 between each tool pot 81 and the tool holding unit 59 may be carried out by driving back-and-forth movement of the tool pot 81 in the front-rear direction with the position of the tool holding unit 59 fixed.

In the above-described embodiments, the position for work to which the tool holding unit 59 is moved for setup of a tool T2 is set to be adjacent to the right opening 61*a* of the machine tool 1. The position for work is not limited to such a position and, for example, may be set to be adjacent to the front opening (not illustrated) of the machine tool 1.

In the above-described embodiments, the controller 100 is configured to, in the setup mode, restrain opening and closing of the movable door 64 with the lock device until the tool holding unit 59 arrives at the position for work. The present invention is not limited to this configuration. For example, the lock device for the movable door 64 may be eliminated. In this case, the opening of the movable door 64 for setup of a tool T2 is not limited to taking place after the movement of the tool holding unit 59 to the position for work and, for example, the worker W may open the movable door 64 prior to the movement of the tool holding unit 59 to the position for work.

Further, in the above-described embodiments, the machine tool 1 is composed of a horizontal machining center. The present invention is not limited to a horizontal machining center. For example, the machine tool 1 may be composed of a lathe, a vertical machining center, or a combined machining machine capable of both turning and milling.

In the above-described embodiments, the tool change operation and setup operation of the tool conveyance mechanism 50 are performed on a long-length tool T2. The present invention is not limited to this configuration. For example, the tool change operation and setup operation of the tool conveyance mechanism 50 may be performed on a standard-size tool T1, so that standard-size tools T1 are stored in the long-length tool stocker 8.

In the above-described embodiments, the long-length tool stocker 8 is arranged on the top of the ceiling cover 61*a* of the machine tool 1. The long-length tool stocker 8 is not limited to this arrangement and, for example, may be arranged on a side of the machine tool 1.

In the above-described embodiments, the standard tool changer 4 performs the tool change with the tool change arm 41 with the conveyance unit 42 intervening between the tool magazines 71 and the spindle 2. The present invention is not limited to this configuration. For example, the conveyance unit 42 may be eliminated, so that the standard tool changer 4 performs the tool change with the tool change arm 41 directly between the tool magazines 71 and the spindle 2.

The foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

A Machining chamber
B Stocker receiving space
C Arm receiving space
T1 Tool (tool to be stored in the second tool stocker)
T2 Tool (tool to be stored in the first tool stocker)
W Worker
1 Machine tool
2 Spindle
4 Standard tool changer (magazine-type tool changer)
7 Standard tool stocker (second tool stocker)
8 Long-length tool stocker (first tool stocker)
13 Opening and closing shutter (opening and closing member)
14 Opening and closing shutter (opening and closing member)
41 Tool change arm
50 Tool conveyance mechanism
59 Tool holding unit
61 Outer cover
61*a* Ceiling cover
61*b* Side wall cover
61*c* Right opening (opening for work)
61*d* Ceiling opening
61*e* First opening
64 Movable door
64*a* Door body part
64*b* Ceiling door part (ceiling wall)
64*c* Second opening
71 Tool magazine
100 Controller (conveyance control unit)

102 Shutter drive unit (drive unit)

The invention claimed is:

1. A machine tool at least including:

a spindle arranged in a machining area and configured to detachably hold a tool; and a cover body formed by at least a ceiling cover and a side wall cover and surrounding the machining area to separate the machining area from outside, wherein:

the machine tool includes:

a tool stocker configured to store the tool to be attached to the spindle;

a tool conveyance mechanism having a tool holding unit configured to detachably hold the tool and configured to move the tool holding unit along a predetermined path, wherein the tool conveyance mechanism is arranged to be located above the ceiling cover; and a conveyance control unit configured to control the tool conveyance mechanism;

the tool conveyance mechanism is configured to move the tool holding unit at least to a tool change position for transferring the tool between the tool holding unit and the spindle, a stocker position for transferring the tool between the tool holding unit and the tool stocker, and a position for work set as a position for a worker to perform work on the tool holding unit from outside of the machining area, wherein the position for work is set inside the machining area adjacent to the side wall cover;

the tool stocker is arranged on top of the ceiling cover or above the ceiling cover;

the ceiling cover has formed therein a first opening for the tool holding unit to pass through when moved to the position for work;

the side wall cover and the ceiling cover adjacent to the position for work respectively have second openings formed therein, the second openings being connected to each other;

the machine tool further includes a movable door configured to open and close the second openings by linear sliding movement;

the movable door has a door body part and a ceiling door part, the door body part opening and closing the second opening formed in the side wall cover, the ceiling door part being connected to an upper end of the door body part and opening and closing the second opening formed in the ceiling cover; and the first opening is formed in the ceiling door part.

2. The machine tool according to claim 1, wherein:

the tool change position is set inside the machining area; and the ceiling cover has formed therein a third opening for the tool holding unit of the tool conveyance mechanism to pass through when moved to the tool change position.

3. The machine tool according to claim 2 wherein the machine tool further includes: a first opening and closing mechanism configured to open and close the third opening; and a second opening and closing mechanism configured to open and close the third opening.

4. The machine tool according to claim 1, wherein:

the machine tool includes the tool stocker as a first tool stocker and further includes a second tool stocker different from the first tool stocker;

the second tool stocker has a plurality of tool holding units connected successively and is configured to detachably hold a tool in each of the tool holding units;

the machine tool further includes a tool changer configured to perform a tool change between the spindle and the second tool stocker; and the position for work is set on a side opposite to the second tool stocker with the spindle therebetween.

5. The machine tool according to claim 4, wherein the first tool stocker is configured to store a tool having a greater length than the tool to be stored in the second tool stocker.

6. The machine tool according to claim 5, wherein a position of the spindle when the tool is transferred between the tool holding unit of the tool conveyance mechanism at the tool change position and the spindle and a position of the spindle when the tool changer performs the tool change are set at a same position.

7. The machine tool according to claim 4, wherein a position of the spindle when the tool is transferred between the tool holding unit of the tool conveyance mechanism at the tool change position and the spindle and a position of the spindle when the tool changer performs the tool change are set at a same position.

8. The machine tool according to claim 1, wherein the machine tool further includes: a first opening and closing mechanism configured to open and close the third opening; and a second opening and closing mechanism configured to open and close the first opening.

* * * * *